(12) United States Patent
Churnock et al.

(10) Patent No.: US 9,871,406 B1
(45) Date of Patent: Jan. 16, 2018

(54) RESERVE POWER SYSTEM TRANSFER SWITCHES FOR DATA CENTER

(71) Applicant: Amazon Technologies, Inc., Reno, NV (US)

(72) Inventors: Paul Andrew Churnock, Vashon, WA (US); Huyen Van Nguyen, Bothell, WA (US); Kelsey Michelle Wildstone, Seattle, WA (US); Patrick Hughes, Enfield (IE); Nigel McGee, Ashburn, WA (US)

(73) Assignee: Amazon Technologies, Inc., Reno, NV (US)

(*) Notice: Subject to any disclaimer, the term of this patent is extended or adjusted under 35 U.S.C. 154(b) by 849 days.

(21) Appl. No.: 14/133,525

(22) Filed: Dec. 18, 2013

(51) Int. Cl.
*H02J 9/06* (2006.01)

(52) U.S. Cl.
CPC .................................. *H02J 9/061* (2013.01)

(58) Field of Classification Search
None
See application file for complete search history.

(56) References Cited

U.S. PATENT DOCUMENTS

| | | | |
|---|---|---|---|
| 4,060,735 A | 11/1977 | Pascucci et al. |
| 5,583,440 A | 12/1996 | Bisher |
| 5,675,194 A | 10/1997 | Domigan |
| 5,745,356 A | 4/1998 | Tassitino et al. |
| 5,770,897 A | 6/1998 | Bapat et al. |
| 6,191,500 B1 | 2/2001 | Toy |
| 6,304,006 B1 | 10/2001 | Jungreis |
| 6,433,444 B1 | 8/2002 | de Vries |
| 6,583,519 B2 | 6/2003 | Aberle et al. |
| 6,624,533 B1 | 9/2003 | Swanson et al. |
| 6,992,247 B2 | 1/2006 | Rasmussen et al. |
| 7,197,888 B2 | 4/2007 | LeClear et al. |
| 7,265,458 B2 | 9/2007 | Edelen et al. |
| 7,449,798 B2 | 11/2008 | Suzuki et al. |
| 7,459,803 B2 | 12/2008 | Mosman |
| 7,472,290 B2 | 12/2008 | Diab et al. |

(Continued)

OTHER PUBLICATIONS

U.S. Appl. No. 12/825,198, filed Jun. 28, 2010, Osvaldo P. Morales.

*Primary Examiner* — Rexford Barnie
*Assistant Examiner* — Swarna N Chowdhuri
(74) *Attorney, Agent, or Firm* — Robert C. Kowert; Meyertons, Hood, Kivlin, Kowert & Goetzel, P.C.

(57) ABSTRACT

A system for performing computing operations in a data center includes one or more sets of computer systems, one or more primary power systems, and a reserve power system. The primary power systems include a downstream portion that supplies power to at least one of the sets of computer systems. The reserve power system includes switches that switch between supplying a primary power feed and a reserve power feed from the reserve power system through part of the primary power system. An input resiliency switch can switch between supplying primary power or reserve power to support power supplied to the sets of computer systems through the primary power system based upon a primary power feed fault. A power distribution switch can switch between supplying primary power and reserve power to part of the downstream portion of the primary power system to bypass an upstream portion of the primary power system.

20 Claims, 10 Drawing Sheets

(56) References Cited

U.S. PATENT DOCUMENTS

| | | |
|---|---|---|
| 7,478,251 B1 | 1/2009 | Diab et al. |
| 7,514,815 B2 | 4/2009 | Paik et al. |
| 7,521,884 B2 | 4/2009 | Filippenko |
| 7,560,831 B2 | 6/2009 | Whitted et al. |
| 7,565,555 B2 | 7/2009 | Diab |
| 7,566,988 B2 | 7/2009 | Heber et al. |
| 7,616,432 B2 | 11/2009 | Luebke et al. |
| 7,642,676 B2 | 1/2010 | Washington |
| 7,661,459 B2 | 2/2010 | Wesley et al. |
| 7,888,816 B2 | 2/2011 | Zajkowski |
| 7,939,968 B2 | 5/2011 | Hjort et al. |
| 7,982,338 B2 | 7/2011 | O'Leary |
| 7,991,588 B1 | 8/2011 | Krieger |
| 8,108,699 B2 | 1/2012 | Diab |
| 8,173,898 B2 | 5/2012 | Rasmussen et al. |
| 8,212,401 B2 | 7/2012 | Linkhart et al. |
| 8,212,427 B2 | 7/2012 | Spitaels et al. |
| 8,222,548 B2 | 7/2012 | Espeut, Jr. |
| 8,251,785 B2 | 8/2012 | Schmitt et al. |
| 8,294,297 B2 | 10/2012 | Linkhart et al. |
| 8,447,569 B1 | 5/2013 | Marwah et al. |
| 2004/0201282 A1 | 10/2004 | Kado et al. |
| 2005/0200205 A1* | 9/2005 | Winn ............... H02J 9/062 307/64 |
| 2006/0202559 A1 | 9/2006 | Hashimoto et al. |
| 2007/0046103 A1 | 3/2007 | Belady et al. |
| 2007/0118772 A1 | 5/2007 | Diab |
| 2008/0116898 A1 | 5/2008 | Washington |
| 2008/0120187 A1 | 5/2008 | Wesley et al. |
| 2008/0303347 A1 | 12/2008 | Zajkowski |
| 2009/0009001 A1 | 1/2009 | Marwali et al. |
| 2009/0033153 A1 | 2/2009 | Linkhart et al. |
| 2009/0314541 A1 | 12/2009 | Jones et al. |
| 2009/0314889 A1 | 12/2009 | Baatz et al. |
| 2010/0141039 A1 | 6/2010 | 8Elady et al. |
| 2010/0235671 A9 | 9/2010 | Jain |
| 2011/0049980 A1 | 3/2011 | Paik et al. |
| 2011/0141039 A1 | 6/2011 | Park |
| 2011/0187197 A1 | 8/2011 | Moth |
| 2011/0260538 A1 | 10/2011 | Huang |
| 2012/0000975 A1 | 1/2012 | Heath et al. |
| 2012/0068541 A1 | 3/2012 | Anderson |
| 2012/0109553 A1 | 5/2012 | Hancock et al. |
| 2012/0181869 A1* | 7/2012 | Chapel ............... H02J 9/06 307/64 |
| 2012/0331477 A1 | 12/2012 | Zeighami et al. |

* cited by examiner

RESERVE POWER SYSTEM TRANSFER SWITCHES FOR DATA CENTER

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Because the computer room of a computing facility may contain a large number of servers, a large amount of electrical power may be required to operate the facility. In addition, the electrical power is distributed to a large number of locations spread throughout the computer room (e.g., many racks spaced from one another, and many servers in each rack). Usually, a facility receives a power feed at a relatively high voltage. This power feed is stepped down to a lower voltage (e.g., 110V). A network of cabling, bus bars, power connectors, and power distribution units, is used to deliver the power at the lower voltage to numerous specific components in the facility.

Some data centers have no redundancy at the PDU level. Such data centers may have a large affected zone when a UPS or PDU failure in the power system occurs. In addition, some data centers have "single threaded" distribution via the electrical supply to the floor, and in which maintenance can only be performed when the components are shut-off.

Some data centers include back-up components and systems to provide back-up power to servers in the event of a failure of components or systems in a primary power system. In some data centers, each primary power system may have its own back-up system that is fully redundant at all levels of the power system. For example, in a data center having multiple server rooms, each server room may have its own primary power system and back-up power system. The back-up system for each server room may have a switchboard, uninterruptible power supply (UPS), and floor power distribution unit (PDU) that mirrors a corresponding switchboard, uninterruptible power supply, and floor power distribution unit in the primary power system for that server room. Providing full redundancy of the primary power systems may, however, be very costly both in terms of capital costs (in that in may require a large number of expensive switchboard, UPSs, and PDUs, for example) and in terms of costs of operation and maintenance. In addition, with respect to the primary computer systems, special procedures may be required to switch components from the primary system to a back-up system to ensure uninterrupted power supply for the servers, further increasing maintenance costs.

Figure 1:
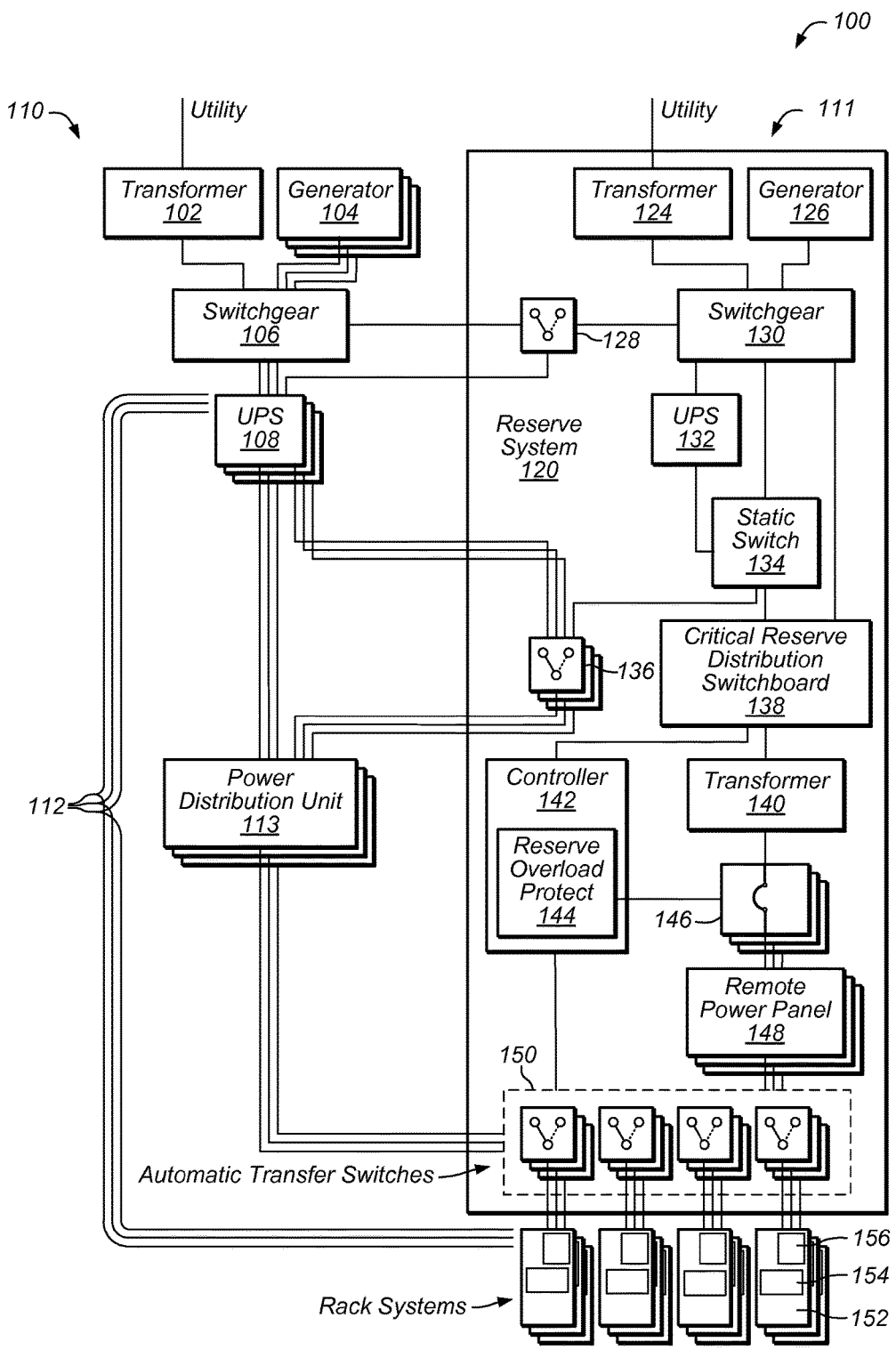
FIG. 1 is a block diagram illustrating one embodiment of a data center having a reserve power system that backs up primary power systems for multiple rooms of a data center.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a reserve power system for computer systems in a data center are disclosed. According to one embodiment, a system for performing computing operations in a data center includes two or more sets of computer systems, one or more primary power systems, and a reserve power system. Each set of computer systems may correspond, for example, to a rack in the data center. In certain embodiments, the reserve power system is configured to automatically supply reserve power to the computer systems. The reserve power system includes an Uninterruptible Power Supply Input Resiliency Switch (UIRS) that switches a power feed supporting the two or more sets of computer systems, via a primary power-side uninterruptible power supply (UPS), between a primary power feed and a reserve power feed, such that the reserve power feed is supplied to the two or more sets of computer systems via at least the UIRS and the primary power-side UPS, and a portion of the primary power system is bypassed as the source of power to the primary power-side UPS. The reserve power system also includes a power distribution transfer switch (PDTS) that switches a power feed supporting at least one of the two or more sets of computer systems, via a primary power-side power distribution unit (PDU), between a primary power feed received from the primary power-side UPS and a reserve power feed received from the reserve power-side UPS, such that the reserve power feed is supplied to the at least one set of computer systems via at least the PDTS and the primary power-side PDU, and at least a portion of the primary power system is bypassed as the source of power for the primary power-side PDU. In certain embodiments, the total power requirements of the computer systems exceeds the capacity of the PDTS to supply reserve power, and the capacity of the UIRS meets or exceeds the total power requirements.

According to one embodiment, a system for providing reserve power to computer systems in a data center includes a reserve power system. The reserve power system includes a reserve power feed and automatically supplies power to at least two sets of computer systems receiving power from one or more primary power systems, which include a primary power feed, if a condition is met. The reserve power system further includes an open-transition transfer switch that switches between supplying power to the two or more sets of computer systems from the primary power feed or the reserve power feed via a downstream portion of the primary power system, so that an upstream portion of the primary power system is bypassed from supplying power to the computer systems and neither power feed is supplied concurrently. The switching may be based at least in part upon a determination of a fault in the primary power feed.

According to one embodiment, a method for selectively switching a power feed supplied to a plurality of computer systems includes monitoring a primary power feed supplied to the plurality of computer systems via at least one portion of a primary power system and triggering an open-transition transfer switch in response to a determination of a fault in the primary power feed through at least one other portion of the primary power system. The open-transition transfer switch is triggered to selectively switch the power feed from the primary power feed to a reserve power feed supplied from a reserve power system.

In various embodiments, redundant power is provided for many different power distribution systems. In one embodiment, power redundancy is sized such that a system can support any N distribution system failures. In some embodiments, part or all of a reserve power system is oversubscribed to achieve N+1 redundancy for a data center (rather than, for example, 2N power redundancy). In some embodiments, a system having less than one-to-one redundancy may include overload protection, such as a breaker system, to protect against overload of a reserve power system.

In some embodiments, a reserve power system provides back up power for systems and components from top to bottom in a power distribution chain. In certain embodiments, a reserve power system backs up a primary power system including a transformer that receives power from a utility feed, a backup generator for the utility feed, a switchboard that receives power from the transformer, one or more UPSs that receive power from the switchboard, and one or more power distribution units.

In some embodiments, a reserve power system includes one or more switching devices that provide reserve power support for one or more components in the primary power system, so that reserve power is supplied through the one or more components to one or more downstream components.

Such switching devices may include a UIRS that provides reserve power support to one or more UPS devices in the primary power system to bypass one or more components upstream of the UPS, including a primary power-side switchgear, power source, etc., to supply reserve power to one or more sets of computer systems via at least the primary power-side UPS. A UIRS may be controllably operated to automatically switch the UPS from primary power support to reserve power support based upon one or more indications of a fault condition upstream of the UPS in the primary power system. The UIRS may include an open-transition switch that implements "break-before-make" switching between primary power and reserve power, where the switch breaks the primary power feed to the UPS before connecting the reserve power feed to the UPS, so that the primary UPS does not concurrently receive primary power and reserve power.

Such switching devices may include, in addition or in alternative, a PDTS that provides reserve power support to one or more sets of computer systems via a component in the primary power system. The component may be the first device upstream of the computer systems that can support power to at least one entire set of computer systems, multiple sets of computer systems, all computer systems, etc. The component may be the furthest downstream component of the primary power system that is upstream of one or more switching devices that automatically switch a power feed supporting one or more computer systems between primary power and reserve power. The PDTS may include a closed-transition switch that implements "make-before-break" switching between primary power and reserve power, where the switch connects the reserve power feed to the computer systems before breaking the primary power feed from the computer systems, so that power supplied to the computer systems is uninterrupted by the switching and concurrent supply of primary and reserve power occurs for at least a period of time. The switching may be selectively enabled by one or more controllers that monitor both a primary power feed and a reserve power feed to the PDTS and prevent switching based upon one or more parameters of the feeds, including synchronization.

As used herein, "computer room" means a room of a building in which computer systems, such as rack-mounted servers, are operated.

As used herein, "data center" includes any facility or portion of a facility in which computer operations are carried out. A data center may include servers dedicated to specific functions or serving multiple functions. Examples of computer operations include information processing, communications, simulations, and operational control.

As used herein, "operating power" means power that can be used by one or more computer system components. Operating power may be stepped down in a power distribution unit or in elements downstream from the power distribution units. For example, a server power supply may step down operating power voltages (and rectify alternating current to direct current).

As used herein, "power distribution unit", also referred to herein as a "PDU", means any device, module, component, or combination thereof, which can be used to distribute electrical power. The elements of a power distribution unit may be embodied within a single component or assembly (such as a transformer and a rack power distribution unit housed in a common enclosure), or may be distributed among two or more components or assemblies (such as a transformer and a rack power distribution unit each housed in separate enclosure, and associated cables, etc.). A power distribution unit may include a transformer, power monitoring, fault detection, isolation.

As used herein, "primary power" means any power that can be supplied to an electrical load, for example, during normal operating conditions.

As used herein, "floor power distribution unit" refers to a power distribution unit that can distribute electrical power to various components in a computer room. In certain embodiments, a power distribution unit includes a k-rated transformer. A power distribution unit may be housed in an enclosure, such as a cabinet.

As used herein, "rack power distribution unit" refers to a power distribution unit that can be used to distribute electrical power to various components in a rack. A rack power distribution may include various components and elements, including wiring, bus bars, connectors, and circuit breakers.

As used herein, "remote power panel" means any panel, device, module, component, or combination thereof, that can be used to transfer or distribute electrical power from one or more input conductors to one or more output conductors. In certain embodiments, a remote power panel includes main lug only panel conductors. A remote power panel may be housed in an enclosure, such as a cabinet.

As used herein, "reserve power" means power that can be supplied to an electrical load upon the failure of, or as a substitute for, primary power to the load.

As used herein, "source power" includes power from any source, including but not limited to power received from a utility feed. In certain embodiments, "source power" may be received from the output of another transformer (which is sometimes referred to herein as "intermediate power").

As used herein, "computer system" includes any of various computer systems or components thereof. One example of a computer system is a rack-mounted server. As used herein, the term computer is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. In the various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

FIG. 1 is a block diagram illustrating one embodiment of a data center having a reserve power system that backs up primary power systems for multiple rooms of a data center. Data center 100 includes rack 152, primary power side 110, and reserve power side 111. Primary power side 110 includes transformer 102, generators 104, switchgear 106, and primary power systems 112. Sets of computer systems 154 in racks 152 may perform computing operations in data center 100. Computer systems 154 may be, for example, servers in a server room of data center 100. Computer systems 154 in racks 152 may each receive power from one of primary power systems 112. In one embodiment, each of primary power systems 112 corresponds to, and provides power to, the servers in one room in data center 100. In one embodiment, each of primary power systems 112 corresponds to, and provides power to, one rack system in data center 100.

Primary power systems 112 each include UPS 108 and floor power distribution unit 113. Floor power distribution unit 113 provides power to various racks 152. In some embodiments, floor power distribution unit 113 includes a transformer that transforms the voltage from switchgear 106. Each of rack 152 may include a rack power distribution unit 156. Rack power distribution units 156 may distribute power to computer systems 154.

Transformer 102 is coupled to a utility feed. The utility feed may be a medium voltage feed. In certain embodiments, the utility feed is at a voltage of about 13.5 kilovolts or 12.8 kilovolts at a frequency of about 60 Hz. Generators 104 may provide power to primary power systems 112 in the event of a failure of utility power to transformer 102. In one embodiment, one of generators 104 provides back-up power for each of primary power systems 112. UPS 108 may provide uninterrupted power to racks 152 in the event of a power failure upstream from UPS 108.

Reserve power system 120 may provide reserve power for all of the computer systems 154 supplied by primary power systems 112. In some embodiments, reserve power system 120 is powered up at all times during operation of data center 100. Reserve power system 120 may be passive until a failure of one or more components of primary power side 110, at which time reserve power system 120 may become active.

For illustrative purposes, three primary power systems are shown in FIG. 1 (for clarity, details of only the front primary power system 112 are shown). The number of primary power systems 112 on primary power side 110 may vary, however. In certain embodiments, a primary power side may include only one primary power system. In addition, the number of power distribution units, UPSs, switchgear apparatus may vary from embodiment to embodiment (and, within a given embodiment, from system to system). In some embodiments, primary power system 112 includes many floor power distribution units 113. As another example, a primary power system may have one UPS that can supply power to many floor power distribution units.

Reserve power system 120 includes transformer 124 and generator 126. Transformer 124 may supply power to switchgear 130. Critical reserve distribution board 138 may receive power from switchgear 130. Power from switchgear 130 may pass through UPS 132. Static switch 134 is provided between UPS 132 and critical reserve distribution switchboard 138. Static switch 134 may provide for bypass of UPS 132 (for example, during maintenance of UPS 132, during particular switching operations, etc.).

Reserve power system 120 also includes transformer 140 and remote power panel 148. Transformer 140 may transform power from critical reserve distribution switchboard 138 and supply power to remote power panels 148. Remote power panels 148 may distribute power to servers 154 in racks 152. In one embodiment, each of remote power panels 148 of reserve power system 120 corresponds to one of floor power distribution units 113 of one of primary power systems 112. For example, if a floor power distribution unit distributes primary power to all of the computer systems in a rack, a remote power panel may distribute reserve power to all of the computer systems in that rack.

Reserve power system 120 also includes an array of automatic transfer switches 150. Automatic transfer switches 150 may control switching of power to computer systems 154 between primary power side 110 and reserve power side 111 and may automatically switch power from one of primary power systems 112 to reserve power system 120. In some embodiments, one automatic transfer switch is provided for each rack system in a computer room. Thus, an automatic transfer switch may switch input power to the rack between one of floor distribution units 113 and one of remote power panels 148. In another embodiment, an automatic transfer switch provided for each half of a rack system. In still another embodiment, automatic transfer switches may be provided at the server level. In certain embodiments, a reserve power system includes manual transfer switches. Manual transfer switches may be used, for example, to enable maintenance operations to be performed.

Although in the embodiment shown in FIG. 1, power to servers is switched between primary power and reserve power, in some embodiments, a data center may not have automatic transfer switches to switch between primary power and reserve power. In some embodiments, for example, servers in a rack system (such as servers 154 in racks 152) may be dual-supplied by two power systems or include power supplies that accept two our more power source inputs. A server may be supported from two power feeds without an automatic transfer switch. In some embodiments, a redundant power system for servers in a data center may operate in an active-active failover configuration. In other embodiments, a redundant power system for servers in a data center may operate in an active-passive failover configuration.

Reserve power system 120 further includes controller 142. Controller 142 may serve various control functions in reserve power system 120. In some embodiments, controller 142 may control some or all of automatic transfer switches 150 in reserve power system 120. Controller 142 may control some or all of transfer switches 128, 136, some combination thereof, etc. in reserve power system 120. Controller 142 includes reserve overload protect circuit 144. In certain embodiments, controller 142 includes at least one programmable logic controller. The programmable logic controller may control some or all of the switching in or among devices in reserve power system 120. In some embodiments, some or all of controller 142 is implemented, in part or in full, by one or more computer systems.

Shunt trips 146 are provided for each remote power panel 148. Shunt trips 146 may provide overload protection for reserve power system 120. For example, if automatic transfer switches 150 switch too much of the load from computer systems 154 to reserve power system 120, some of shunt trips 146 may shed their respective remote power panels 148 (and thus shut down the computer systems 154 that are receiving power from those remote power panels 148). The shedding of computer systems may be based, for example, on priority of the various computer systems receiving power from reserve power system 120. In certain embodiments, shunt trips 146 are controlled by overload protect circuit 144 of controller 142.

In some embodiments, each automatic transfer switch is internally controlled. The automatic transfer switch may include fault detection circuitry such that when a fault condition is detected in the primary power input, the automatic transfer switch automatically switches to reserve power. Thus, for the computer systems coupled to the switch, in the event of a failure in any of the elements on primary power side 110 upstream from an automatic transfer switch 150, including floor power distribution unit 113, UPS 108, or switchgear 106, the automatic transfer switch may transfer input power from primary power to reserve power. Following such transfer, the computer systems that have been switched to reserve power may receive power from remote power panel 148 of reserve power system 120. In addition, the computer systems that have been switched to reserve power may be protected against power interruption by UPS 132. In one embodiment, failover from primary power to reserve power is carried out within about 8 to about 20 milliseconds.

In some embodiments, a reserve power system may include transfer switches between primary power system and a reserve power system at multiple levels in a power chain. Such transfer switches at multiple levels may enable various levels of maintainability and resilience of the power chain. For example, a reserve power system may include various transfer switches at a UPS level and/or transfer switches at a switchgear level of the power distribution chain. In some embodiments, one or more transfer switches in a data center includes one or more circuit breakers, switchgear, etc., which may include one or more air circuit breakers (ACB).

In some embodiments, a reserve power system includes one or more Input Resiliency Switches (IRS) that provide concurrent resiliency for some or all of the primary power systems in a data center. In some embodiments, an IRS comprises at least one transfer switch and provides automatic switching of power support for at least a portion of a primary power system from a primary power feed to a reserve power feed based at least in part upon determination of a fault condition associated with the primary power feed. For example, transfer switch 128 may include one or more IRS devices that can automatically switch the source of power supplied to one or more primary power systems 112 between switchgear 106 of primary power side 110 and switchgear 130 of reserve power side 111 (for example, in the event of a failure of switchgear 106). An IRS, in some embodiments, can switch the power feed supporting one of UPSs 108. Such an IRS may be referred to herein as an Uninterruptible Power Supply IRS (UIRS). In some embodiments, an IRS can switch one or more power feeds supporting all UPSs 108 in all primary power systems 108. Such switching may be controlled, at least in part by one or more controllers in reserve power system 120, including controller 142. Such switching may be controlled at least in part by circuitry internal to switch 128.

In some embodiments, an IRS comprises an open-transition switch and is configured to break one connection before making another connection. For example, where switch 128 is to switch a UPS 108 from a primary power feed from switchgear 106 to a reserve power feed from switchgear 130, IRS may break the connection between switchgear 106 and UPS 108 before connecting switchgear 130 to UPS 108. In some embodiments, some or all of the primary power feed from switchgear 106 passes through switch 128, such that switching the switch 128 to switchgear 130 would isolate switchgear 106, transformer 102, and generator 104 from one or more UPSs 108. In some embodiments, switch 128 is connected to a power bus (not shown) to which switchgear 106 and UPSs 108 are connected, and switch 128 may operate in concert with one or more other switches to isolate switchgear 106 from the bus before connecting switchgear 130 to the bus.

In some embodiments, a reserve power system includes one or more Power Distribution Transfer Switches (PDTS), which may comprise one or more transfer switches that can switch a power feed supporting at least a portion of one or more primary power systems between a primary power feed and a reserve power feed, thereby enabling another portion of the primary power systems to be bypassed and isolated, de-energized, etc. for maintenance operations. In some embodiments, a PDTS device comprises a closed-transition transfer switch. In the illustrated embodiments, one or more of switches 136 may include a PDTS device that can operate, alone or in concert with one or more other switching devices, to bypass power feeds from both a primary power-side UPS 108 and a reserve power-side UPS 132 through the switch 136 and then switch the power feed supplied to one or more floor power distribution units 113 in a closed-transition switching. Such closed-transition switching may be referred to as "make-before-break" switching and may include establishing a power feed connection to at least temporarily provide power from both the primary power feed and the reserve power feed before breaking another power feed connection. Closed-transition switching may ensure an uninterrupted supply of power to the one or more computer systems 154 supported by the floor power distribution unit 113 affected by the PDTS device 136 that is performing the switching.

In some embodiments, one or more PDTS devices 136 is associated with a controller that tests power feeds made available to the PDTS device for synchronization and may command some or all of the PDTS devices 136 to selectively enable or inhibit closed-transition switching between power feeds based upon the testing. For example, where a primary power feed supplied to a PDTS device 136 is determined to be not synchronized with a reserve power feed supplied to the PDTS device 136, the PDTS device may be inhibited from switching between the power feeds. For example, the primary power feed may be supported by transformer 102, but the reserve power feed may be supported by a generator 126, which could lead to the two power feeds not being synchronized. Testing may include processing various properties, parameters, characteristics, etc. of the power feeds and determining that the processed data indicates whether the power feeds are synchronized within a tolerance ("threshold") level, which may be predetermined. In some embodiments, a threshold level may be determined concurrently with testing and may vary based upon one or more current conditions in some or all of the data center, historical conditions, some combination thereof, conditions associated with the power feeds, etc. Such testing and selective enablement and inhibition ensures that the power feeds can concurrently serve the computer systems during the closed-transition switching.

In some embodiments, the PDTS devices 136 are configured to support the furthest downstream component of each of one or more primary power systems that supports two or more sets of computer systems 154. In some embodiments, one or more PDTS devices 136 support the furthest downstream component of one or more primary power systems that support all computer systems 154 in a data center 100. For example, in the illustrated embodiment, the PDTS devices 136 are each coupled to a primary power system 112 at a floor power distribution unit 113, which may be the furthest downstream component in the primary power system 112 that supports all of the computer systems 154 supported by that respective primary power system 112. In this way, the PDTS devices 136 collectively couple to the components 113 furthest downstream in the primary power systems 112 that still support all of the computer systems 154 in data center 100. By coupling to such furthest downstream components, and using closed-transition switching, the PDTS devices 136 can switch the power feed supporting the computer systems supported by the primary power system without interrupting the supply of power to the computer systems.

In some embodiments, one or more of the PDTS devices 136 switch power feeds based at least in part upon manual user input commands. For example, where maintenance is desired to be performed on one or more UPSs 108, etc., a user may manually provide input to one or more devices in reserve power system 120 to command one or more PDTS devices 136 to switch one or more PDUs 113 supported by the particular UPSs 108 to be supported by UPS 132 and isolate the particular UPS 108s from the computer systems 154. The UPSs 108 may then be de-energized and maintenance can be performed on the devices. When maintenance is complete, the UPSs 108 may be re-energized, and the PDTS devices 136 may be commanded to switch the PDU 113 to be supported by the UPSs 108 again.

In some embodiments, a primary power system may be interpreted to encompass switchgear 106, transformer 102, and generator 104. The components 102-106 may be understood to each be comprised within multiple different power systems. In such an embodiment, transformer 102, generator 104, and switchgear 106 may be included in an upstream portion of each of the primary power systems 112, and at least a part of each primary power system 112 may include a "downstream" portion of the respective primary power system 112.

In some embodiments, some or all of a reserve power system is oversubscribed. As used herein, "oversubscribed" refers to a condition in which total power requirements of the systems coupled to a reserve power system exceed the capacity of some or all of the reserve power system (which includes, for example, exceeding the capacity of a subsystem such as a reserve UPS). For example, a reserve power system might have 5 rack systems coupled to it, but only be able to provide reserve power to one of the rack systems at any given time through a downstream component. In some embodiments, a reserve power system may be heavily oversubscribed (for example, subscribed at several times the capacity of the reserve power system). In certain embodiments, oversubscription is applied at a facility-wide level.

In one illustrative embodiment, the total power requirements of computer systems 154 exceed the capacity of some or all of reserve power system 120, such that reserve power system 120 is oversubscribed relative to its capacity at various components in power system 120. For example, the total power requirements of all computer systems 154 in data center may exceed 200 KVA, and the load capacity of reserve power system 120 at the switchgear 130 may also exceed 200 KVA, while the load capacity of reserve power system 120 downstream of the UPS 132 and static switch 134 may be about 20 KVA. Thus, if all of primary power systems 112 failed simultaneously and automatic transfer switches 150 transferred all of computer systems 154 in data center 100 to reserve power system 120, reserve power system 120 would not be able to supply power to all of the computer systems through one of the UPS 132 and static switch 134. In some embodiments, a reserve power system may include overload protection against overload caused, for example, by switching of loads to the reserve power system in excess of capacity. In one embodiment, a reserve power system may have multiple computer rooms coupled to the reserve power system, but have the capacity to support one the computer systems of only one computer room at any given time.

In another example, if switchgear 106 failed and IRS 128 transferred all of the UPSs 108 in all of the primary power systems 112 to be supported by a reserve power feed from switchgear 130, reserve power system 120 would be able to supply power to all of the computer systems through switch 128 and primary power systems 128. In some embodiments, the IRS 128 and the PDTS 136 in a reserve power system 120 are differently subscribed to the computer systems 154. For example, because the IRS 128 supports power for one or more primary power systems 112 upon a fault condition associated with a primary power feed from switchgear 106, IRS 128, and all other upstream components of reserve power system 120, may be "fully subscribed" such that IRS 128 and all upstream components of reserve power system 120 have a load capacity that can at least meet the total power requirements of the computer systems 154 in data center 100 and being supported through IRS 128. In another example, because each PDTS 136 is operated to simply take some or all of a single primary power system supporting only some of the total number of computer systems in a data center 100, each PDTS 126, and the components of reserve power system 120 downstream of IRS 128, may have a load capacity that is less than the total power requirements of the total computer systems 154 in data center 100.

Figure 2A:
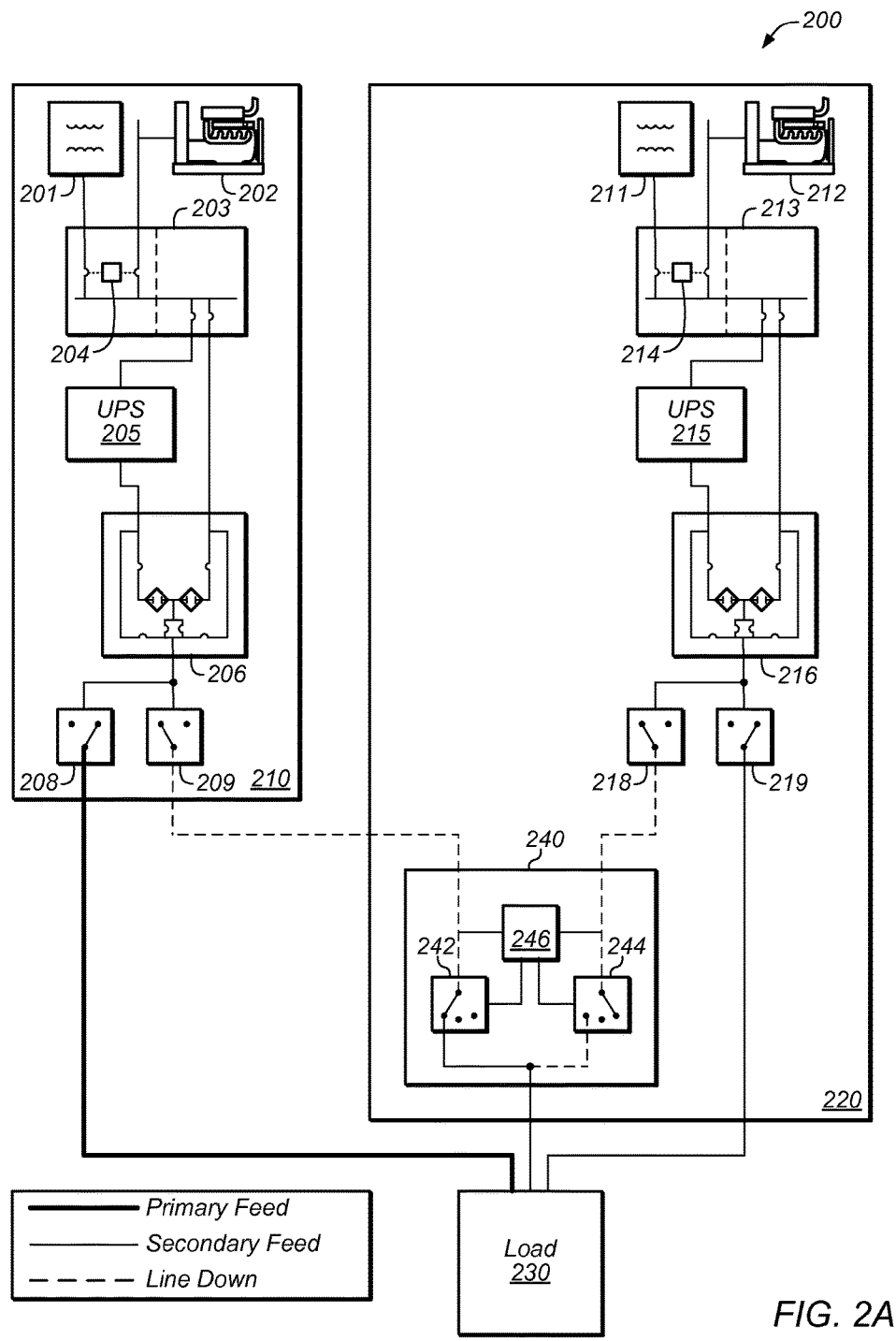
FIGS. 2A, 2B, and 2C are schematics illustrating one embodiment of a reserve power system that includes a power distribution transfer switch.
Figure 2B:
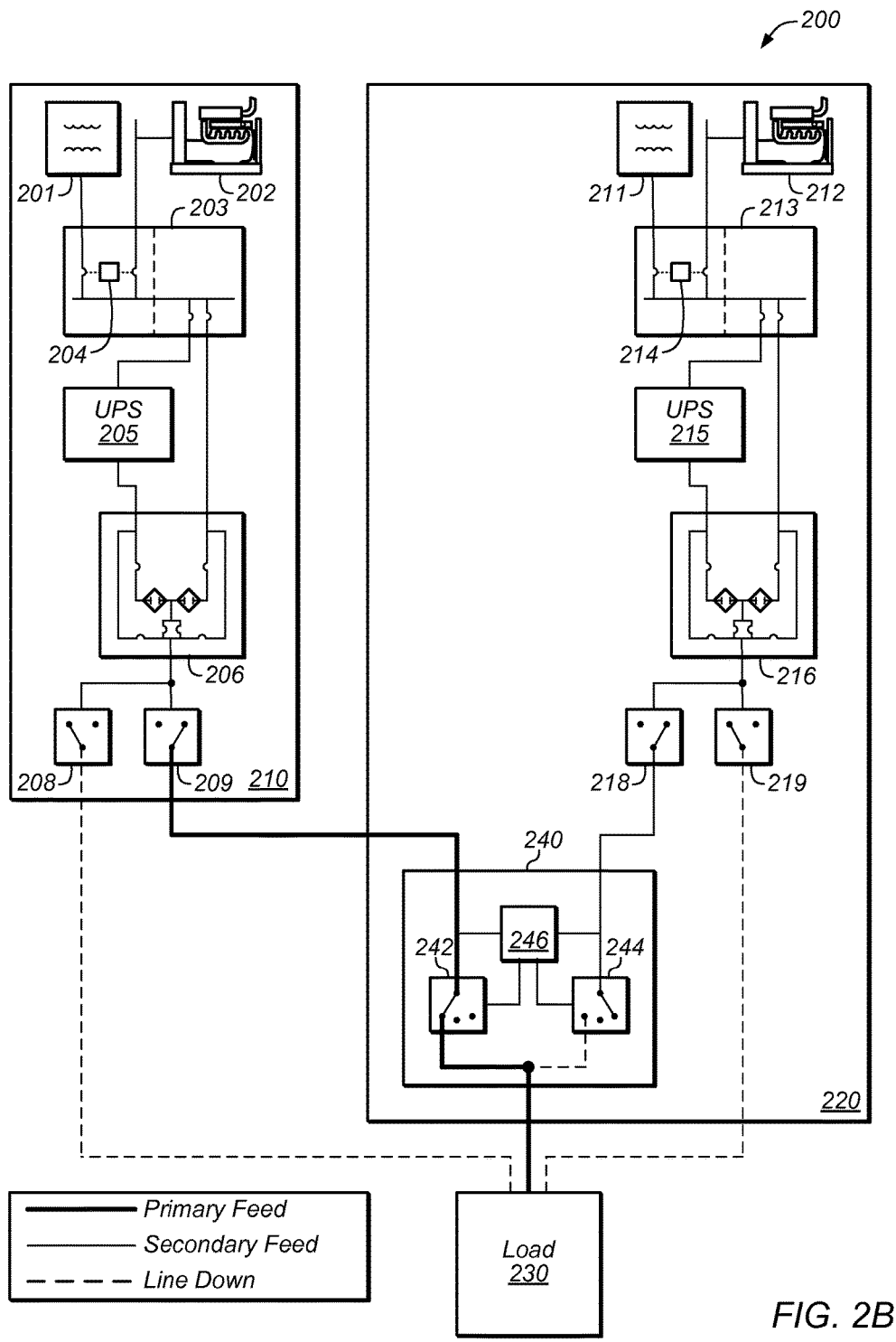
Figure 2C:
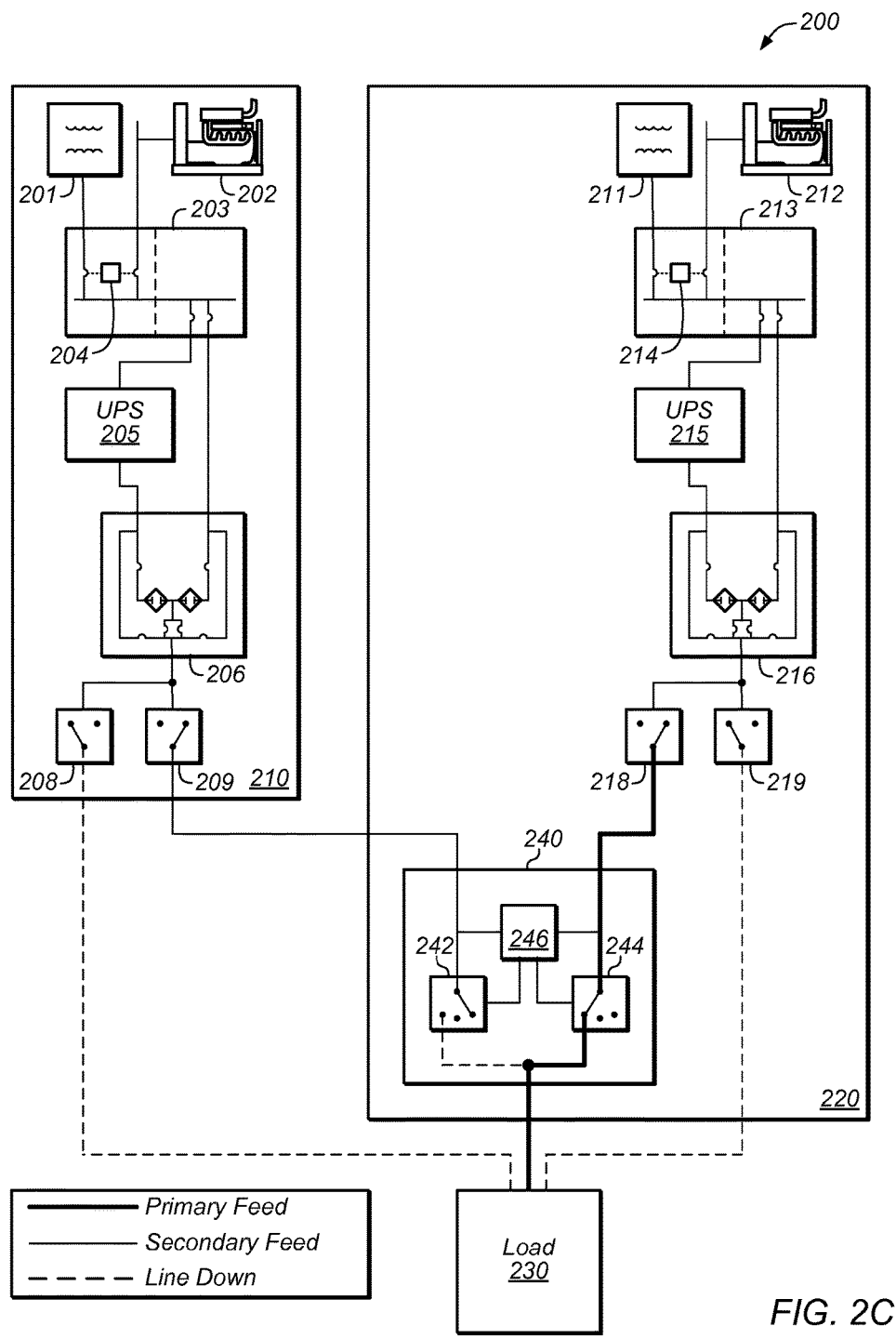

FIGS. 2A, 2B, and 2C are schematics illustrating one embodiment of a reserve power system that includes a power distribution transfer switch. Data center 200 includes primary power system portion 210, reserve power system portion 220, and load 230. Load 230 may include one or more sets of computer systems that provide computing capacity to data center 200. Load 230 may further include a portion of one or more of the primary power system and reserve power system. For example, load 230 may include a primary power-side floor PDU of the primary power system and an automatic transfer switch supported of the reserve power system, where the automatic transfer switch can selectively switch between supporting one or more sets of computer systems with power from either the floor PDU or the reserve power system.

Primary power system portion 210 includes transformer 201, generator 202, primary bypass switchboard 203, UPS 205, primary bypass static switch 206, primary buscoupler switch 208, and primary bypass switch 209. Switchboard 203 includes automatic transfer switch 204. Automatic transfer switch 204 may provide automatic switching from utility feed via transformer 201 to generator 202 (for example, in the event of a failure of utility power. Primary bypass static switch 206 may allow bypass of UPS 205.

Reserve power system portion 220 includes transformer 211, generator 212, reserve bypass switchboard 213, UPS 215, reserve bypass static switch 216, reserve buscoupler switch 219, reserve bypass switch 218, and PDTS device 240. Switchboard 213 includes automatic transfer switch 214. Automatic transfer switch 214 may provide automatic switching from utility feed via transformer 211 to generator 212 (for example, in the event of a failure of utility power. Reserve bypass static switch 216 may allow bypass of UPS 215.

PDTS device 240 includes a primary power control switch 242, a reserve power control switch 244, and a controller 246. In some embodiments, a PDTS device in a reserve power system portion is a closed-transition transfer switch that switches a load from being supported by a primary power feed to being supported by a reserve power feed in a make-before-break switching process. As discussed above, a PDTS in a reserve power system portion is configured to support a downstream primary power system component, including a primary power-side PDU that supports one or more sets of computer systems downstream of the primary power system. In some embodiments, the controller 246 selectively enables or inhibits switching of one or more of the switches 242, 244 based upon testing of the power feeds made available to the PDTS device via bypass switches in one or more power system portions. For example, as shown in the illustrated embodiment, controller 246 may be coupled to the primary power bypass feed connecting switch 209 to switch 242 and to the reserve power bypass feed connecting switch 218 to switch 244. The controller may include, be coupled to, some combination thereof, etc. one or more sensors that generate data regarding the bypass feeds. The controller may process the data and selectively enable or inhibit switching based upon the processing. For example, controller 246 may enable one or more switches 242, 244 to be closed or opened where the primary and reserve bypass feeds are determined to be synchronized within a predetermined threshold level based on sensor data, and controller 246 may inhibit one or more switches 242, 244 from being closed or opened where the primary and reserve bypass feeds are determined to be not synchronized within a predetermined threshold level, which may be the same or a different threshold level, based on sensor data. As shown in the illustrated embodiments, the outputs from both switches 242, 244 are joined, such that closing both switches 242, 244 enables the load 230 to be supported by both primary power and reserve power. As such, ensuring synchronization of the feeds may ensure that the load is not damaged when both feeds support the load concurrently.

In some embodiments, one or more of the primary power system and the reserve power system include one or more buscoupler switches and bypass switches that are configured to selectively route a primary power feed or reserve power feed, respectively, to one or more of a power bus serving one or more sets of computer systems, a downstream component of a power system, and a PDTS device. In some embodiments, a buscoupler switch (also referred to as a bus coupler, bus coupling switch, and the like) may selectively couple a power feed from a power system portion to a power bus supporting one or more components. For example, buscoupler switch 219 may be coupled to a power bus (not shown) in load 230 that is coupled to multiple sets of computer systems. In another example, buscoupler switch 208 may be coupled to a power bus, which may be a different power bus, in load 230 that is coupled to multiple PDUs, sets of computer systems, etc. In some embodiments, the PDTS device may be coupled directly to one or more PDUs, computer systems, one or more various power buses coupled to same, etc.

The buscoupler and bypass switches may be operated independently, in concert, some combination thereof, etc. For example, a power feed from a portion of one of the power systems can be at least partially bypassed through the PDTS device while concurrently supporting a load via a buscoupler switch, and the buscoupler switch can be opened so that the load is fully supported by the power system through the PDTS device. The PDTS device can then switch the load from being supported by the power feed of the power system to another power feed of another power system.

The following discussion describes switching between supporting a load 230 through a primary power feed to supporting the load through a reserve power feed using the PDTS device 240 according to one embodiment, as illustrated in FIGS. 2A-C.

Turning first to FIG. 2A, buscoupler switches 208, 219 are initially closed, such that the load 230 is supported by a primary power feed and a reserve power feed from the respective buscoupler switches. As illustrated by the boldface path from switch 208 to load 230, the primary power feed is currently the primary feed supporting load 230, while the reserve power feed from switch 219, though available to support load 230, is not currently being used to support load 230. For example, where load 230 includes an automatic transfer switch supporting one or more sets of computer systems, the automatic transfer switch may preferentially route power from an available primary power feed to the computer systems, as opposed to an available reserve power feed.

As shown in FIG. 2A, the bypass feeds from switches 209, 218 to PDTS device 240 are initially unavailable as those switches are open. The illustrated routing of power in FIG. 2A may represent a normal on-line operating configuration of a data center according to one embodiment, where load 230 is directly supported by available power feeds from both power system portions 210 and 220 through closed buscoupler switches 208, 219 and PDTS device 240 and bypass feeds from switches 209, 218 to PDTS device 240 are unavailable. As also shown in FIG. 2A, switches 242, 244 may be alternately closed and open. The illustrated schematic shows switch 242 in a closed position and switch 244 in an open position, although other configurations of the switches are encompassed by the disclosure. In some embodiments, switches 242, 244 may comprise one or more switching devices. For example, switch 242 may include a 3-position primary power control switch and switch 244 may include a 3-position reserve power control switch.

In some embodiments, one or more of switches 242, 244 may be linked to one or more of switches 208-209, 218-219, where one of the switches 242, 244 is in a particular position based at least in part upon which power system portion is supporting the load 230, even if the corresponding bypass feed is not available. For example, in the illustrated schematic, buscoupler switch 208 is supporting the load 230 and switch 242 is closed. In another example, if buscoupler switch 219 supports the load, which may be due to an automatic transfer switch in the load 230 switching to the reserve power feed, switch 242 may open and switch 244 may close.

Turning to FIG. 2B, bypass switches 209, 218 are closed, such that primary and reserve bypass power feeds are made available to PDTS device 240. Because switch 242 is closed, closing switch 209 routes primary power to support load 230 through switch 242, as illustrated. In addition, buscoupler switches 208 and 219 are opened so that power from power system portions 210 and 220 must pass through PDTS device 240 to support load 230. In some embodiments, switching a given pair of buscoupler switches and bypass switches in a given power system portion may mimic a closed-transition switching process, where one switch is closed before the other switch is opened. For example, switching the positions of switches 208 and 209 may involve first closing bypass switch 209 so that load 230 is supported by the primary power system portion 210 through both switches 208 and 209 concurrently. Once both switches 208-09 are closed, buscoupler switch 208 may be opened, so that all primary power from primary power system portion 210 passes to load 230 through bypass switch 209 and switch 242 in PDTS device 240. In some embodiments, switching the positions of switches 218 and 219 may proceed in a similar manner.

In some embodiments, switching the pairs of buscoupler switches and bypass switches in a given power system portion is preceded by bypassing the UPS in the power system portion. For example, prior to switching the positions of switches 208 and 209, static switch 206 may bypass UPS 205. Static switch 216 may operate similarly.

As shown in FIG. 2B, once the buscoupler switches 208, 219 and bypass switches 209, 218 are switched, the primary and reserve bypass feeds are made available to PDTS device 240, load 230 is supported by primary power via switches 209 and 242, and switch 244 remains open to preclude reserve power from switch 218 from supporting load 230. As discussed further above, controller 246 may selectively enable or inhibit one or more of switches 242 and 244 from changing position, based at least in part upon characteristics of the bypass feeds made available to switches 242, 244. In some embodiments, controller 246 may selectively enable or inhibit the switches 242, 244 from changing position based at least in part upon whether bypass feeds are made available to the switches.

Turning to FIG. 2C, once primary power and reserve power are bypassed through PDTS device 240 to support load 230, the switches 242 and 244 in PDTS device 240 may switch between power feeds supporting the load 230. Such switching may include a make-before-break switching process, where both switches 242, 244 are closed before one switch is opened. For example, in the illustrated embodiment, where respective bypass feeds are available to each switch 242 and 244, which themselves are respectively initially closed and open, as illustrated in FIG. 2A-B, switch 244 may be closed to supply reserve power to support load 230. Because both switches 242, 244 are then closed, load 230 is concurrently supported by primary power and reserve power from the respective bypass feeds. As discussed above, such switching may be selectively enabled or inhibited by controller 246. Once switch 244 is closed, switch 242 may be opened, breaking the connection between primary power system portion 210 and load 230. As a result, and as illustrated in FIG. 2C, the reserve power feed is the feed supporting load 230. In some embodiments, once switch 242 is opened, primary power system portion 210 is isolated from load 230, and selected components therein, including the UPS 205, switchboard 203, static switch 206, etc. may be de-energized. In addition, where the static switches 206 and 216 were commanded to bypass the respective UPSs 205 and 215 during the switching, one or more of the static switches can be commanded to bring one or more of the UPSs on-line.

Figure 3A:
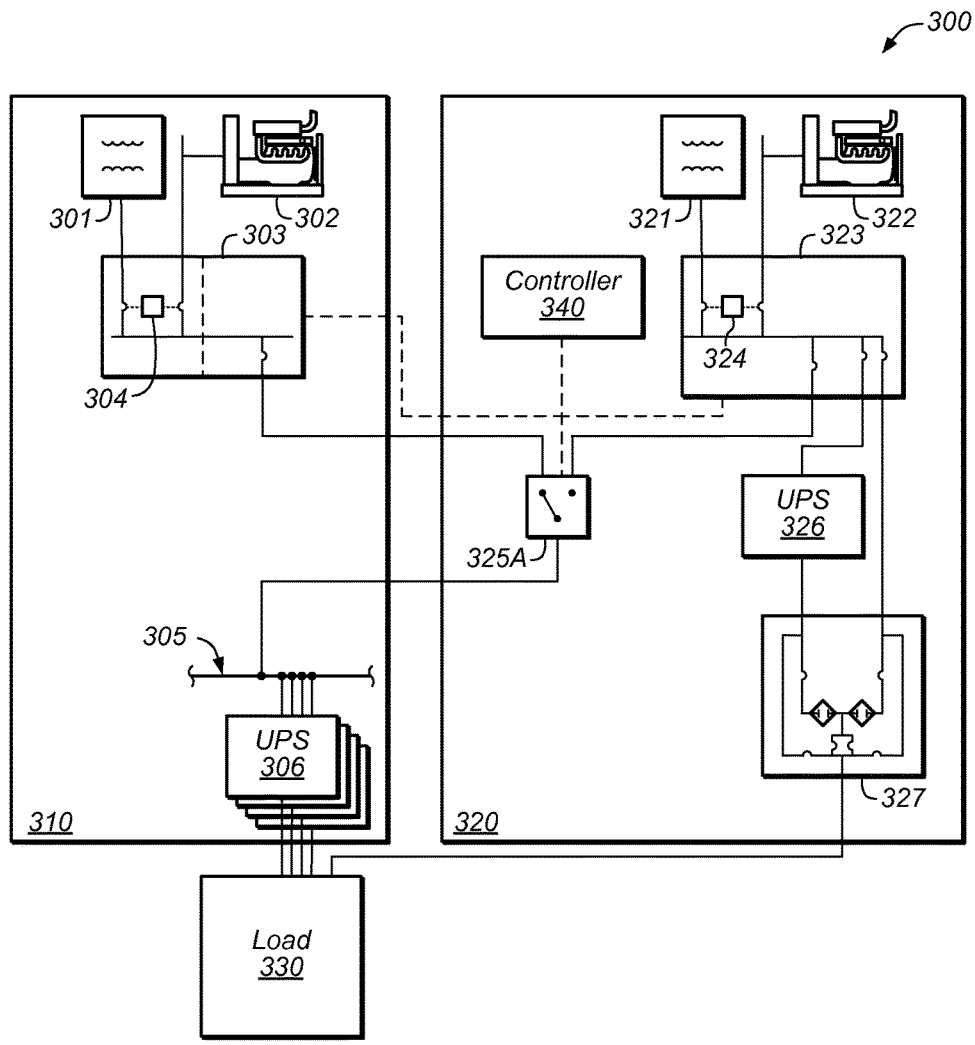
FIG. 3A is a schematic illustrating one embodiment of a reserve power system that includes an input resiliency transfer switch.

FIG. 3A is a schematic illustrating one embodiment of a reserve power system that includes an input resiliency transfer switch. Data center 300 includes primary power system portion 310, reserve power system portion 320, and load 330. As with load 230 illustrated and discussed above with reference to FIG. 2A-C, load 330 may include one or more sets of computer systems, a portion of one or more of the primary power system and reserve power system, etc. Primary power system portion 310 includes transformer 301, generator 302, primary bypass switchboard 303 with automatic transfer switch 304, power bus 305 and primary power-side UPSs 306 coupled to the power bus 305. Power from one of the transformer and generator, as selectively routed by switch 304, is supplied to each of the UPSs 306 via power bus 305. Reserve power system portion 320 includes transformer 321, generator 322, reserve bypass switchboard 323 with automatic transfer switch 324, reserve power-side UPS 326, and reserve bypass static switch 327. Reserve bypass static switch 327 may allow bypass of UPS 326.

In some embodiments, reserve power system portion 320 includes an input resiliency switch (IRS) configured to switch the power feed supporting at least a portion of a primary power system between a primary power feed and a reserve power feed. In some embodiments, where the IRS is configured to switch the power feed supporting one or more primary power-side UPSs between a primary power feed and a reserve power feed, the IRS may be referred to as an uninterruptible power supply IRS, or UIRS. For example, as shown in the illustrated embodiment, reserve power system portion 320 includes a UIRS 325A that is configured to selectively route power from either the primary switchboard 303 or the reserve switchboard 323 to the primary power-side UPSs 306 via power bus 305. In some embodiments, where each switchboard 303, 323 comprises a switchgear, which may include switches 304, 324, UIRS 325A is configured to selectively route power from either the primary switchgear or the reserve switchgear to the primary power-side UPSs 306 via power bus 305.

In some embodiments, an IRS is controllable to switch between power feeds based upon one or more various set conditions associated with one or more power system portions. Such set conditions may include one or more fault conditions associated with one or more of the power feeds, one or more components supporting the power feeds, etc. For example, in the illustrated embodiment, UIRS 325A may be configured to switch between the primary power feed from switchboard 303 and the reserve power feed from switchboard 323 based at least in part upon one or more fault conditions associated with the primary power feed. Such fault conditions may include changes in characteristics of the primary power feed, instability in the primary power feed, loss of the primary power feed, failure of one or more of the transformer 301, generator 302, switch 304, switchboard 303, etc.

In some embodiments, a controller operates an IRS device to selectively route primary power and reserve power to a downstream portion of the primary power system. The controller may be coupled to various components of one or more of a primary power system and a reserve power system and may collect data from one or more of the various components. The data may be processed and used to determine whether to switch power feeds using the IRS device. In the illustrated embodiment, reserve power system portion 320 includes a controller 340 that is communicatively coupled to UIRS 325A, switchboard 303, and switchboard 323. The controller may include one or more elements that can be implemented, in part or in full, by one or more computer systems.

In some embodiments, the controller 340 collects data from switchboard 303 and 323 and processes the data to determine whether a fault condition exists with regard to either the primary power feed or the reserve power feed. As will be discussed further below, various factors may determine whether a fault condition is present with regard to a power feed. In the illustrated embodiment, controller 340 is communicatively coupled to UIRS 325A. In response to determining a fault condition with regard to the primary power feed, the controller 340 is configured to command UIRS 325A to switch from the primary power feed to the reserve power feed. Controller 340 can also command UIRS 325A to switch from the reserve power feed to the primary power feed. Switching by UIRS 325A, as commanded by controller 340, may be automatic based upon data collected from various power system components. In some embodiments, switching may be based at least in part upon receipt of a user input command at one or more components in one or more of the power systems. For example, controller 340 may be coupled to a user interface through which a user may provide an input command to controller 340 to switch UIRS 325A. In some embodiments, controller 340 may be configured to use different control logic in determining whether to switch from the primary power feed or whether to switch from the reserve power feed. For example, controller 340 may be configured to automatically command UIRS 325A to switch from the primary power feed to the reserve power feed based upon determination of a fault condition with regard to the primary power feed and may be further configured to command UIRS 325 to switch from the reserve power feed to the primary power feed based at least in part upon a receiving of a user input command. Such different control logic may be implemented to require manual override to re-set the UIRS 325A to route primary power after a switch to reserve power.

Figure 3B:
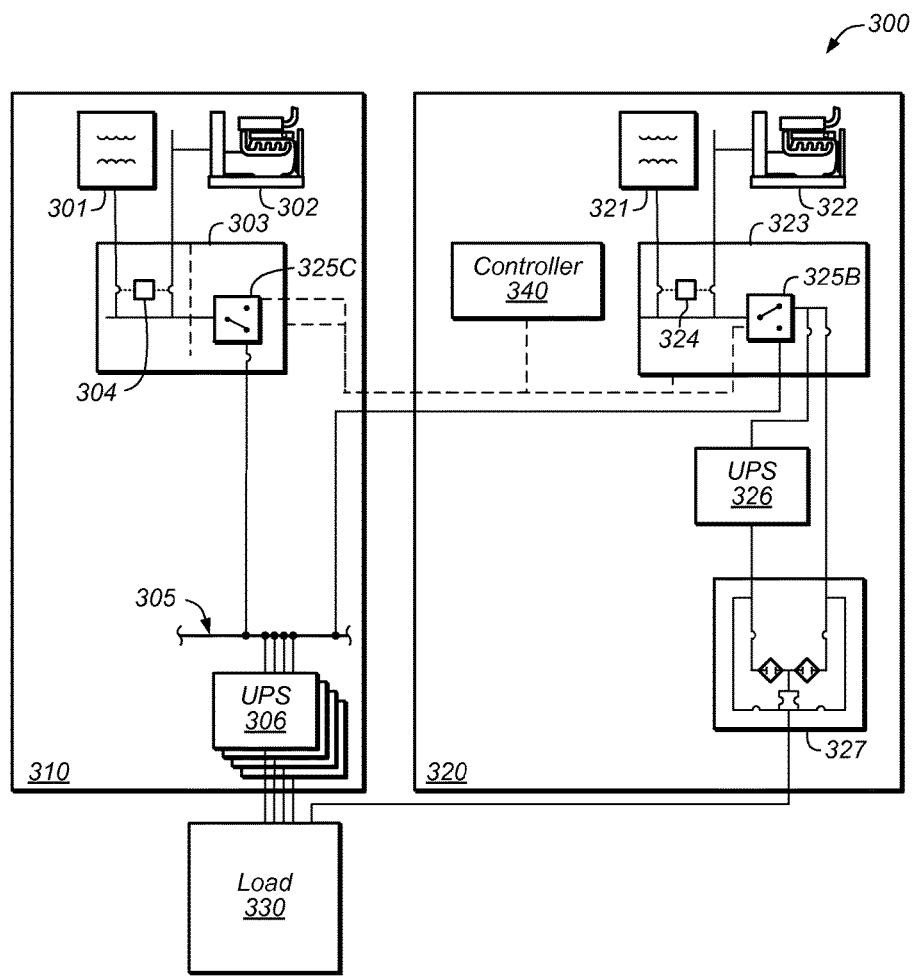
FIG. 3B is a schematic illustrating one embodiment of a reserve power system that includes an input resiliency transfer switch.

In some embodiments, a reserve power system may include a UIRS device that, rather than selectively routing either primary power or reserve power to one or more primary power-side UPSs, is configured to selectively divert some or all of reserve power to the primary power-side UPSs, bypassing at least a portion of the reserve power system. For example, a reserve power system may include a UIRS included in a switchboard that routes all reserve power received from one or more of the reserve power sources to either a downstream portion of the reserve power system or one or more primary power-side UPSs. FIG. 3B illustrates an embodiment of data center 300 that includes a UIRS 325B. The elements of primary power system portion 310 and reserve power system portion 320 may be generally as described above with respect to FIG. 3A. Reserve power system portion 320 shown in FIG. 3B, however, includes a UIRS 325B that is included in switchboard 323 and selectively diverts reserve power from a reserve power feed to downstream components of the reserve power system 320 or the power bus 305 serving the primary power-side UPSs 306. Such selective diversion of power by UIRS 325B may prevent reserve power system portion 320 from supporting the load 330 via one or more downstream components, which may put the reserve resiliency feed to power bus 305 at risk. Selective diversion of reserve power by UIRS 325B may be linked with operation of static switch 327 to isolate UPS 326, thereby preventing the UPS 326 from discharging due to loss of power from switch 325B. Selective diversion of reserve power by UIRS 325B may be linked with operation of switch 325C to isolate the primary power feed from power bus 305, thereby preventing concurrent primary and reserve support of UPSs 306. As shown in FIG. 3B, controller 340 may be communicatively coupled to switch 325C and may command switch 325C to switch in concert with switch 325B. For example, controller 340 may, to switch UPSs 306 from primary power support to reserve power support, may open switch 325C, thereby isolating the primary power feed, prior to commanding switch 325B to divert reserve power to power bus 305.

Figure 4:
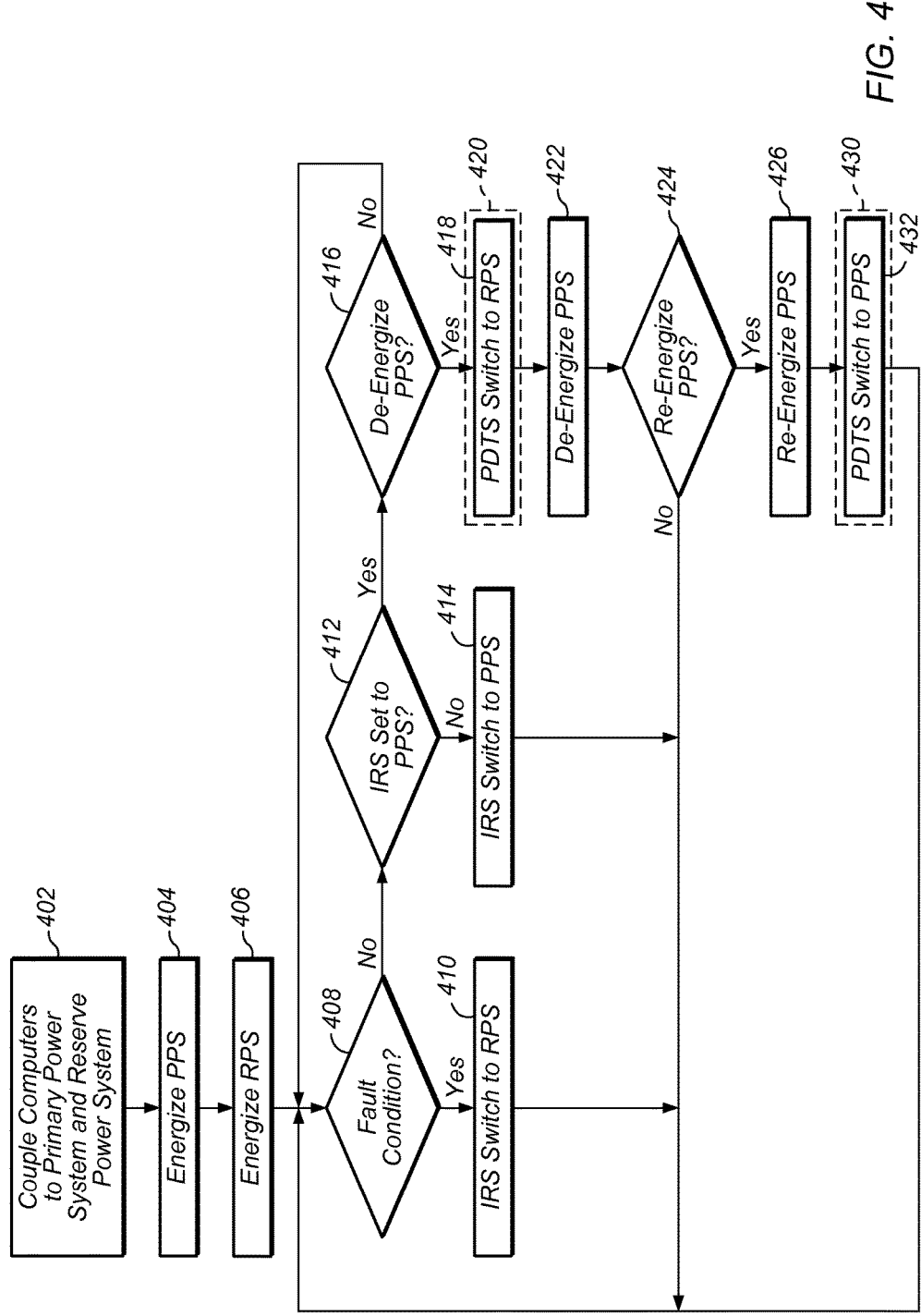
FIG. 4 is a flow diagram illustrating switch control logic for a power system including a power distribution transfer switch and an input resiliency transfer switch according to one embodiment.

FIG. 4 is a flow diagram illustrating switch control logic for a power system including a power distribution transfer switch and an input resiliency transfer switch according to one embodiment. The logic may be implemented by one or more controllers in a system that includes one or more primary power systems and a reserve power system. The controllers may be implemented, in part or in full, by one or more computer systems, such as described further below.

At 402, one or more computer systems are electrically coupled to a primary power system and a reserve power system. Such coupling may include commanding one or more transfer switches to switch to a position to route power from one or more power feeds. For example, one or more bus coupling switches in each of the primary power system and reserve power system may be commanded to close to provide primary power and reserve power to one or more ATS devices, where the ATS devices selectively route one of primary power and reserve power to the computer systems.

At 404 and 405, the primary power system and reserve power system are energized, respectively. Energizing a power system may involve various processes of commanding various switches, devices, electrical components, and the like to energize the power system in a manner that would be known by those of ordinary skill in the art and should be understood to be encompassed by the present disclosure. Upon energizing the power systems, one or more computer systems may be supplied power via the primary power system or the reserve power system based upon one or more conditions in the power system. For the purposes of the following description, the illustrated embodiment will be understood to show that, at 404, the computer systems are supplied with primary power from the primary power system.

At 408, if a fault condition is determined for the primary power system, a UIRS is commanded to switch to the reserve power system, such that a primary power-side UPS switches from being supported by a primary power feed from upstream in the primary power system to being supported by a reserve power feed from the reserve power system. In some embodiments, a fault condition does not necessarily indicate that the supply of power to the primary power-side UPS from the primary power feed has failed. For example, where the primary power feed is supported by a primary power-side utility source and a primary power-side backup power source, which may include another utility source, generator, etc., a fault condition may be determined where one of the power sources fails, which may include the primary utility source, but other primary power-side power sources are still available. In some embodiments, even where backup primary power-side power sources are available, a fault condition may be determined where the ability of the backup power sources to support some or all of the primary power system, supported computer systems, etc. is determined to be at risk. For example, if the primary utility source fails, a duration of the fault may be projected to exceed a threshold time interval associated with the capability of one or more backup power sources. A generator power source may have limited operating time, as determined by fuel, lubricant levels, and other operating parameters. Utility source fault duration may be projected based upon monitoring of parameters of the utility feed, information received from an external source such as the utility provider, etc. In some embodiments, properties of various primary power-side sources may be monitored, and a fault condition may be determined where less than a predetermined threshold number of sources determined to be capable of providing a stable power feed. For example, where a primary power system includes two utility sources, one utility source fails, and a power feed from the other utility source is determined to be unstable, a fault condition may be determined. In some embodiments, a threshold value against which one or more power sources are compared to determine a fault condition include operating costs associated with supplying power from the source, an ability of the power source to supply more than a threshold fraction of the total power requirements of the supported computer systems, etc. Where a backup power source includes a generator, a threshold condition may include a start-up time of the generator: if the generator is off-line, a fault condition may be determined where the start-up time for the generator is greater than a certain amount of time.

If, as shown at 410, a fault condition is determined, a UIRS is commanded to switch to the reserve power system. Such a switching by the UIRS may switch a primary power-side UPS from being supplied with power from a primary power feed upstream of the UPS to being supplied with power from a reserve power feed from the reserve power system. In some embodiments, the switching by the UIRS diverts reserve power from being supplied through some or all of the reserve power system downstream of a particular component of the reserve power system, such as discussed and illustrated above with reference to FIG. 3B. In such an embodiment, 410 may further include commanding various devices, switches etc. to isolate various components of the reserve power system. For example, a reserve power-side UPS may be isolated to prevent discharge to downstream portions of the reserve power system, a bus coupling switch may be commanded to break a connection between the reserve power system and a power bus, etc.

At 412, if no fault condition is determined, a determination is made whether the UIRS is currently switched to enable the primary power-side UPS to be supported by a primary power feed. If not, as shown at 414, the UIRS is commanded to switch to do so. In some embodiments, such as in the illustrated embodiment, the UIRS is switched to provide reserve power support only where a fault condition is detected, and the UIRS is switched to provide primary power support when the fault condition is no longer detected. For example, where a primary power-side utility source fails and a primary power-side backup generator is off-line, a fault condition may be determined and the UIRS may be commanded to switch to reserve support. Once the generator has started up and is on-line, the fault condition may no longer be determined, and the UIRS may be switched back to primary support, so that the generator provides primary power support.

At 416, a determination is made whether to de-energize some or all of the primary power system. Such a determination may be made based upon various parameters associated with various components associated with the primary power system, including one or more UPS devices, PDU devices, switches, power buses, cabling, etc. One or more particular components may be determined to require de-energization for maintenance. If, as shown at 418-420, de-energization is determined to be required, the PDTS may be commanded to switch to the reserve power system to provide reserve power support to some or all of the computer systems through a downstream portion of the primary power system, bypassing the upstream portion of the primary power system and enabling the components in the upstream portion to be de-energized at 422.

At 424, 426, 430, and 432, if the de-energized portions of the primary power system are to be re-energized, such re-energization occurs and the PDTS is commanded to switch back to the primary power system to provide reserve power support to some or all of the computer systems through the upstream portion of the primary power system.

Figure 5:
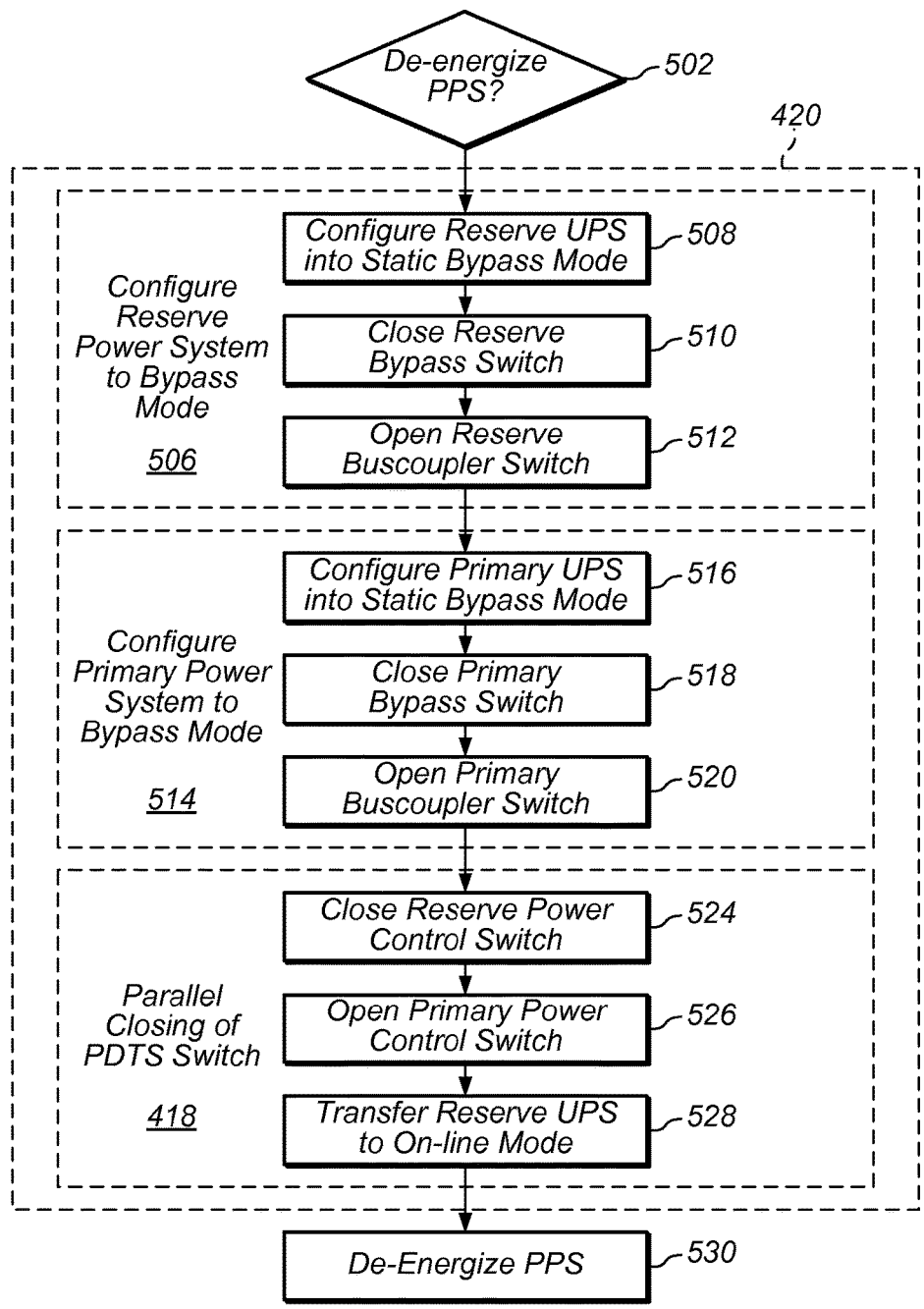
FIG. 5 illustrates switching a power distribution transfer switch from supplying primary power to supplying reserve power according to one embodiment.

FIG. 5 illustrates switching a power distribution transfer switch from supplying primary power to supplying reserve power according to one embodiment. As shown in the illustrated embodiment, the switching process illustrated, in some embodiments, is an expansion of the switching illustrated at 418 and 420 in FIG. 4.

As shown at 502, if an upstream portion of the primary power system is to be de-energized, the reserve power system is configured to supply reserve power to one or more sets of computer systems through the PDTS. Such configuration, as shown at 506, may include commanding one or more switches to switch from supplying reserve power to a load to supplying reserve power to the PDTS. In some embodiments, as discussed further above, the load may include one or more sets of computer systems, one or more power busses configured to distribute at least reserve power to at least one or more sets of computer systems, one or more automatic transfer switches configured to switch between routing primary power or reserve power to one or more computer systems, etc.

As shown at 506 and 508, configuring the reserve power system may include configuring a reserve power-side UPS into static bypass mode. Such configuration may include commanding a static switch, which may include switch 216 illustrated in FIG. 2A-C, to place the reserve power-side UPS into bypass. Such configuration may result in the load being supported through the static switch. As further shown at 510, 506 may include commanding a reserve bypass switch to close. Closing such a reserve bypass switch, which may include switch 218 illustrated in FIG. 2A-C, may enable reserve power to be supplied to the PDTS, which may include switching device 240 illustrated in FIG. 2A-C. As further shown at 512, 506 may include opening a reserve buscoupler switch. Opening such a switch, which may include switch 219 illustrated in FIG. 2A-C, may break a direct electrical connection between the load and the reserve power system and may place the reserve power system in bypass mode, where the reserve power system is configured to supply reserve power to the PDTS, such as illustrated in FIG. 2B.

As shown at 514, the primary power system is configured to supply primary power to one or more sets of computer systems through the PDTS. Such configuration may include commanding one or more switches to switch from supplying primary power to the load to supplying primary power to the load through the PDTS. As shown at 516, 514 may include configuring a primary power-side UPS into static bypass mode. Such configuration may include commanding a static switch, which may include switch 206 illustrated in FIG. 2A-C, to place the primary power-side UPS into bypass. Such configuration may result in the load being supported through the static switch. As further shown at 518, 514 may include commanding a primary bypass switch to close. Closing such a primary bypass switch, which may include switch 209 illustrated in FIG. 2A-C, may enable primary power to be supplied to the load through a closed primary control switch in the PDTS, which may include control switch 242 in switching device 240 as illustrated in FIG. 2A-C. In such an embodiment, the load may be supported by primary power received via both the buscoupler switch and the bypass switch. As further shown at 520, 514 may include opening a primary buscoupler switch. Opening such a switch, which may include switch 208 illustrated in FIG. 2A-C, may break a direct electrical connection between the load and the primary power system and may place the primary power system in bypass mode, where the load receives primary power exclusively through the PDTS, such as illustrated in FIG. 2B.

As shown at 418, and as further illustrated above with reference to FIG. 2B, once the primary power system and the reserve power system are configured into bypass mode, a PDTS is configured to switch between supplying primary power or reserve power to the load. In some embodiments, the load includes at least a portion of one or more primary power systems, reserve power systems, etc. For example, as illustrated above with reference to FIG. 1, the load may include primary power-side PDUs, such that power supplied from the PDTS passes to the PDUs and is distributed to one or more sets of computer systems. Configuring the PDTS to switch between supplying primary power or reserve power may include commanding the PDTS to perform closed-transition switching, where the load may be concurrently supported by a primary power feed and a reserve power feed for a period of time. Such concurrent supply of power may prevent interruptions to the load.

As shown at 524, 418 may include closing a reserve power control switch in the PDTS. Such a switch, which may include switch 244 as illustrated in switching device 240 in FIG. 2A-C, may be configured to supply reserve power support to the load when the switch is closed. In some embodiments, the primary power control switch in the PDTS is already closed and providing primary power support at the time where the reserve power control switch is closed, such that the PDTS provides concurrent primary and reserve power support to the load.

In some embodiments, PDTS includes a controller that selectively enables or precludes the reserve power control switch from closing based upon one or more properties of the primary power feed supplied via the primary bypass switch and the reserve power feed supplied via the reserve bypass switch. The controller may be configured to test one or more of the primary power feed and reserve power feed for synchronization. For example, the controller may receive power feed property data from one or more sensors coupled to the primary power feed, reserve power feed, some combination thereof, or the like, and may process the data to determine whether the power feeds are synchronized. Power feed synchronization may include a match of phase and polarity between the primary power feed and the reserve power feed. Determining synchronization may include determining characteristics including wave form, line voltage, frequency, phase sequence, and phase angle. In some embodiments, an oscilloscope is used for testing of various characteristics. Testing of data from the primary power feed and reserve power feed may occur automatically or semi-automatically. For example, testing may occur continuously, in response to a bypass switch being closed to supply power to the PDTS, etc.

In some embodiments, if the primary power feed and reserve power feed are determined to be not synchronized, the controller may inhibit an open power control switch from closing, so that the power feeds do not concurrently support the load through the PDTS. Such an indication of whether the power feeds are synchronized may be displayed to a user through an indication element, such as a light, in a user interface. In some embodiments, an indication in a user interface indicates whether one or more particular power feeds are available to the PDTS. For example, if the primary power control switch is closed and the power feeds are determined to not be synchronized, the controller may inhibit the reserve power control switch from closing and provide an indication, via a user interface, that the switching is inhibited. In some embodiments, if the primary power feed and reserve power feed are determined to be not synchronized, the controller may enable an open power control switch to close, so that the power feeds can concurrently support the load through the PDTS. For example, if the primary power control switch is closed and the power feeds are determined to be synchronized, the controller may enable the reserve power control switch to close and may provide an indication, via the user interface, that the switching is enabled.

As shown at 526, 418 may include opening a primary power control switch once both power control switches have been closed, so that the reserve power switch is closed and the PDTS supports one or more sets of computer systems with reserve power only. In some embodiments, the power control switches include one or more circuit breakers, including air circuit breakers, where opening or closing the power control switch includes opening or closing one or more air circuit breakers, respectively. As shown at 528, 418 may include transferring the reserve power-side UPS from static bypass mode to on-line or "double conversion" mode. As shown at 530, once the parallel closing of the PDTS is completed, one or more components in the primary power system are bypassed by the PDTS and can be isolated, de-energized, switched out, etc. For example, where maintenance of a primary power-side UPS, such as UPS 205 illustrated in FIG. 2A-C, is required, switching the PDTS to support the load with reserve power may enable the UPS 205 to be de-energized for maintenance.

Figure 6:
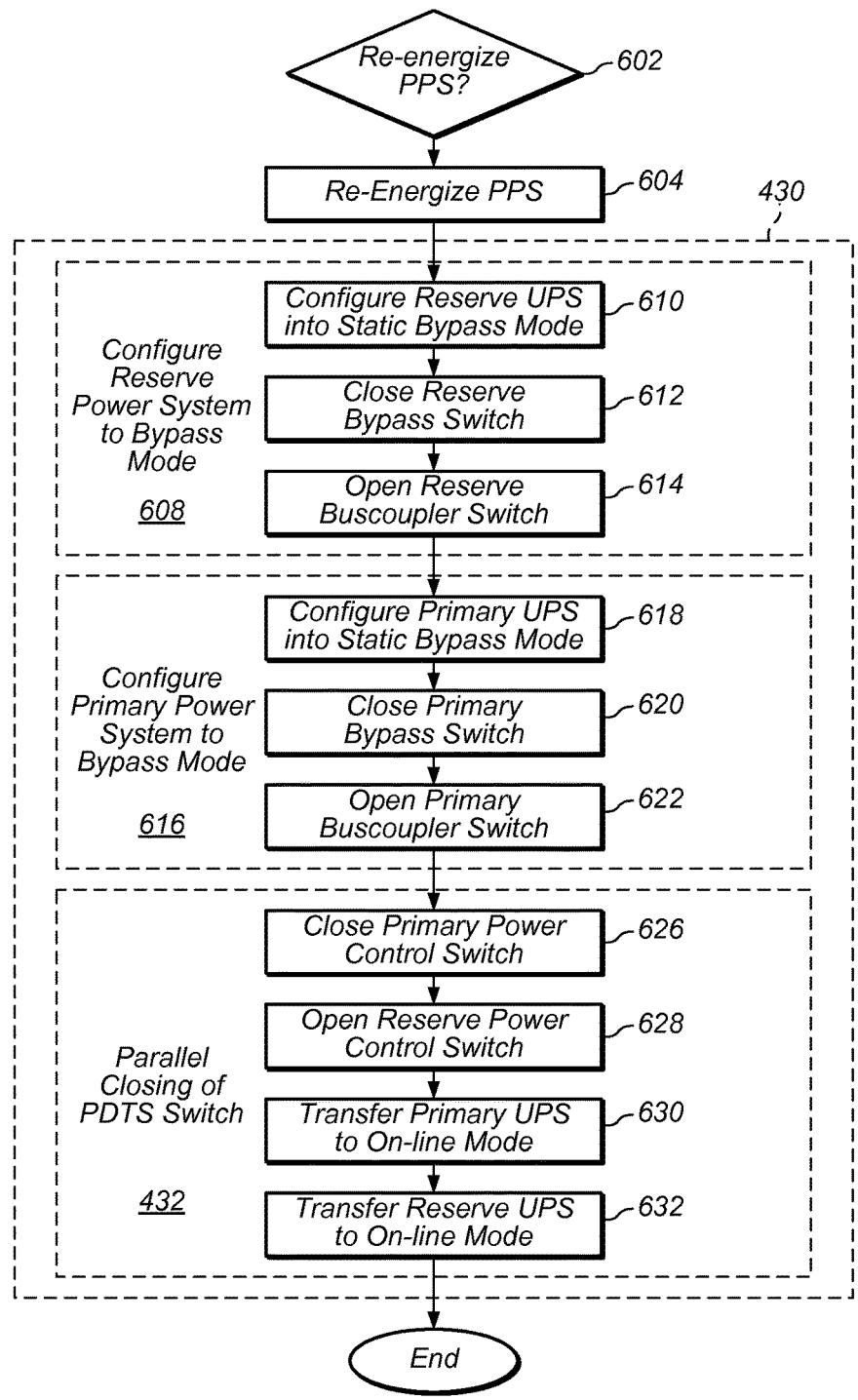
FIG. 6 illustrates switching a power distribution transfer switch from supplying reserve power to supplying primary power according to one embodiment.

FIG. 6 illustrates switching a power distribution transfer switch from supplying reserve power to supplying primary power according to one embodiment. As shown in the illustrated embodiment, the switching process illustrated, in some embodiments, is an expansion of the switching illustrated at 430 and 432 in FIG. 4.

As shown at 602 and 604, if an upstream portion of the primary power system is to be re-energized, once the primary power system portion is re-energized at 604, the reserve power system is configured to supply reserve power to one or more sets of computer systems through the PDTS. Such configuration, as shown at 608, may include commanding one or more switches to switch from supplying reserve power to a load to supplying reserve power to the PDTS.

As shown at 608 and 610, configuring the reserve power system may include configuring a reserve power-side UPS into static bypass mode. Such configuration may include commanding a static switch, which may include switch 216 illustrated in FIG. 2A-C, to place the reserve power-side UPS into bypass. Such configuration may result in the load being supported through the static switch. As further shown at 612, 608 may include commanding a reserve bypass switch to close. Closing such a reserve bypass switch, which may include switch 218 illustrated in FIG. 2A-C, may enable reserve power to be supplied to the PDTS, which may include switching device 240 illustrated in FIG. 2A-C. As further shown at 614, 608 may include opening a reserve buscoupler switch. Opening such a switch, which may include switch 219 illustrated in FIG. 2A-C, may break a direct electrical connection between the load and the reserve power system and may place the reserve power system in bypass mode, where the reserve power system is configured to supply reserve power to the PDTS, such as illustrated in FIG. 2B.

As shown at 616, the primary power system is configured to supply primary power to one or more sets of computer systems through the PDTS. Such configuration may include commanding one or more switches to switch from supplying primary power to the load to supplying primary power to the load through the PDTS. As shown at 618, 616 may include configuring a primary power-side UPS into static bypass mode. Such configuration may include commanding a static switch, which may include switch 206 illustrated in FIG. 2A-C, to place the primary power-side UPS into bypass. Such configuration may result in the load being supported through the static switch. As further shown at 620, 616 may include commanding a primary bypass switch to close. Closing such a primary bypass switch, which may include switch 209 illustrated in FIG. 2A-C, may enable primary power to be supplied to the load through a closed primary control switch in the PDTS, which may include control switch 242 in switching device 240 as illustrated in FIG. 2A-C. In such an embodiment, the load may be supported by primary power received via both the buscoupler switch and the bypass switch. As further shown at 622, 616 may include opening a primary buscoupler switch. Opening such a switch, which may include switch 208 illustrated in FIG. 2A-C, may break a direct electrical connection between the load and the primary power system and may place the primary power system in bypass mode, where the load receives primary power exclusively through the PDTS, such as illustrated in FIG. 2B.

As shown at 432, once the primary power system and the reserve power system are configured into bypass mode, a PDTS is configured to switch between supplying primary power or reserve power to the load. As shown at 626, 432 may include closing a primary power control switch in the PDTS. Such a switch, which may include switch 242 as illustrated in switching device 240 in FIG. 2A-C, may be configured to supply primary power support to the load when the switch is closed. In some embodiments, the reserve power control switch in the PDTS is already closed and providing reserve power support at the time where the primary power control switch is closed, such that the PDTS provides concurrent primary and reserve power support to the load.

In some embodiments, PDTS includes a controller that selectively enables or precludes the primary power control switch from closing based upon one or more properties of the primary power feed supplied via the primary bypass switch and the reserve power feed supplied via the reserve bypass switch. The controller may be configured to test one or more of the primary power feed and reserve power feed for synchronization. In some embodiments, if the primary power feed and reserve power feed are determined to be not synchronized, the controller may inhibit an open power control switch from closing, so that the power feeds do not concurrently support the load through the PDTS. Such an indication of whether the power feeds are synchronized may be displayed to a user through an indication element, such as a light, in a user interface. For example, if the reserve power control switch is closed and the power feeds are determined to not be synchronized, the controller may inhibit the primary power control switch from closing and provide an indication, via a user interface, that the switching is inhibited. In some embodiments, if the primary power feed and reserve power feed are determined to be not synchronized, the controller may enable an open power control switch to close, so that the power feeds can concurrently support the load through the PDTS. For example, if the reserve power control switch is closed and the power feeds are determined to be synchronized, the controller may enable the primary power control switch to close and may provide an indication, via the user interface, that the switching is enabled.

As shown at 632, 432 may include opening a reserve power control switch once both power control switches have been closed, so that the primary power switch is closed and the PDTS supports one or more sets of computer systems with reserve power only. In some embodiments, the power control switches include one or more circuit breakers, including air circuit breakers, where opening or closing the power control switch includes opening or closing one or more air circuit breakers, respectively. As shown at 630, 432 may include transferring the primary power-side UPS from static bypass mode to on-line or "double conversion" mode. As shown at 632, 432 may include transferring the reserve power-side UPS from static bypass mode to on-line or "double conversion" mode.

Figure 7:
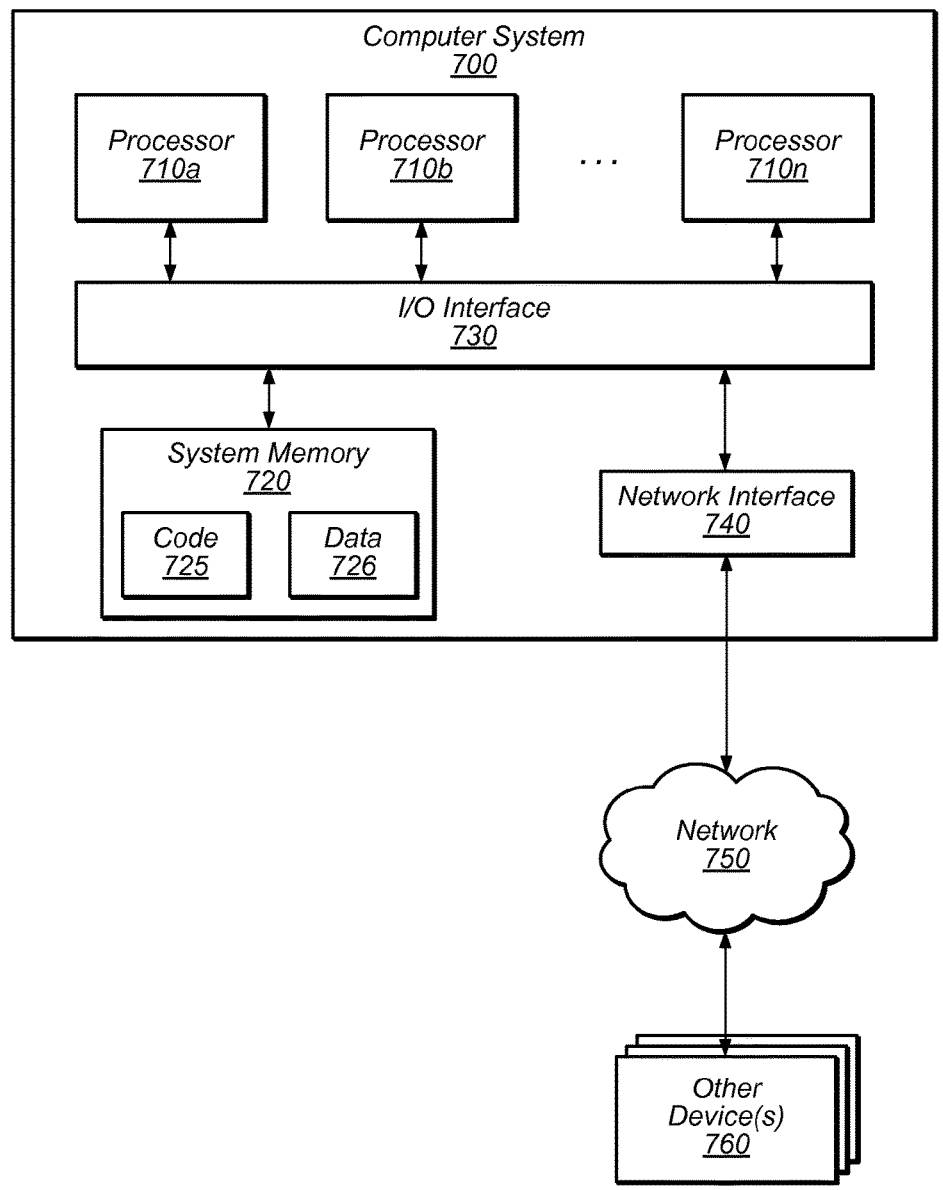
FIG. 7 is a block diagram illustrating an example computer system that may be used in some embodiments.

FIG. 7 is a block diagram illustrating an example computer system that may be used in some embodiments.

In some embodiments, a system that implements a portion or all of one or more of the technologies, including but not limited to a portion or all of the reserve power system, one or more modules included in the reserve system, and various power management methods, systems, devices, and apparatuses as described herein, may include a general-purpose computer system that includes or is configured to access one or more computer-accessible media, such as computer system 700 illustrated in FIG. 7. In the illustrated embodiment, computer system 700 includes one or more processors 710 coupled to a system memory 720 via an input/output (I/O) interface 730. Computer system 700 further includes a network interface 740 coupled to I/O interface 730.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as a portion or all of the power infrastructure, one or more modules included in the power monitoring system, and various power management methods, systems, devices, and apparatuses as described herein, are shown stored within system memory 720 as code 725 and data 726.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network or networks 750, such as other computer systems or devices as illustrated in FIGS. 1 through 7, for example. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-accessible medium configured to store program instructions and data for implementing embodiments of power management methods as described above relative to FIGS. 1-6. In other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 700 via I/O interface 730. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system for performing computing operations in a data center, the system comprising:
   two or more sets of computer systems;
   one or more primary power systems configured to supply power to the two or more sets of computer systems, wherein at least one of the one or more primary power systems comprises a primary power-side power source, a primary power-side switchgear, a primary power-side uninterruptible power supply (UPS), and at least one primary power-side distribution unit (PDU);
   a reserve power system configured to automatically supply reserve power to the two or more sets of computer systems, wherein the reserve power system comprises:
      a reserve power-side switchgear configured to selectively route reserve power from at least one reserve power-side power source,
      a reserve power-side uninterruptible power supply (UPS),
      a UPS input resiliency switch (UIRS) configured to selectively switch a power feed supporting the two or more sets of computer systems, via the primary power-side UPS, between a primary power feed received from the primary power-side switchgear and a reserve power feed received from the reserve power-side switchgear, such that the reserve power feed is supplied to the two or more sets of computer systems via at least the UIRS and the primary power-side UPS, and the primary power-side switchgear is bypassed as a source of power to the primary power-side UPS, and a power distribution transfer switch (PDTS) configured to selectively switch a power feed supporting at least one of the two or more sets of computer systems, via the primary power-side PDU, between a primary power feed received from the primary power-side UPS and a reserve power feed received from the reserve power-side UPS, such that the reserve power feed is supplied to the at least one set of computer systems via at least the PDTS and the primary power-side PDU, and at least a portion of the primary power system is bypassed as a source of power for the primary power-side PDU;

wherein a capacity of the PDTS to supply reserve power is exceeded by a total power requirement of the two or more sets of computer systems, and a capacity of the UIRS to supply reserve power at least meets the total power requirement of the two or more sets of computer systems.

2. The system of claim 1, wherein:
the PDTS comprises a closed transition transfer switch; and
the UIRS comprises an open transition transfer switch.

3. The system of claim 2, wherein the PDTS is configured to selectively switch the power feed for at least one of the two or more sets of computer systems between the primary power feed and the reserve power feed based at least in part upon a testing of synchronization of the primary power feed with the reserve power feed.

4. The system of claim 1, wherein the PDTS is configured to enable at least the portion of the primary power system to be selectively energized upon being bypassed as the source of power for the primary power-side PDU.

5. The system of claim 1, wherein:
the UIRS is configured to automatically switch the power feed supporting the two or more sets of computer systems based at least in part upon a detection of a fault in the primary power feed supplied from the primary power-side switchgear; and
the PDTS is configured to selectively switch the power feed supporting the at least one of the two or more sets of computer systems based at least in part upon a user input received at a user interface.

6. A system for providing reserve power to computer systems in a data center, comprising:
a reserve power system coupled to, and configured to automatically supply power to two or more sets of computer systems receiving power from a primary power system if at least one condition is met, wherein the primary power system comprises a primary power feed and the reserve power system comprises a reserve power feed; and
an open-transition transfer switch configured to selectively switch a power feed supporting the two or more sets of computer systems between the primary power feed and the reserve power feed, such that an upstream portion of the primary power system is bypassed from supplying power to the two or more sets of computer systems, a downstream portion of the primary power system supplies power from the reserve power feed to the two or more sets of computer systems, and neither power feed is supplied concurrently via the downstream portion of the primary power system, wherein the open transfer switch is configured to switch the power feeds based at least in part upon an indication of a fault in the upstream portion of the primary power system, wherein the downstream portion of the primary power system is separate from the reserve power system.

7. The system of claim 6, wherein:
the primary power system comprises a primary power-side uninterruptible power supply (UPS) that is configured to supply power to the two or more sets of computer systems;
to selectively switch the power feed supporting the two or more sets of computer systems, via the downstream portion of the primary power system, between the primary power feed and the reserve power feed, the open-transition transfer switch is configured to selectively supply reserve power from the reserve power feed to the primary power-side UPS, such that reserve power is supplied to the two or more sets of computer systems through the primary power-side UPS.

8. The system of claim 6, wherein:
to selectively switch the power feed supporting the two or more sets of computer systems, via the downstream portion of the primary power system, between the primary power feed and the reserve power feed, the open-transition transfer switch is configured to selectively divert reserve power from being supplied to a downstream portion of the reserve power system to be supplied to the downstream portion of the primary power system.

9. The system of claim 8, wherein:
the open-transition transfer switch is configured to selectively divert reserve power from being supplied to the downstream portion of the reserve power system to be supplied to the downstream portion of the primary power system based at least in part upon the indication of the fault in primary power supplied to the two or more computer systems, and the open-transition transfer switch is further configured to selectively divert reserve power from being supplied to the downstream portion of the primary power system to be supplied to the downstream portion of the reserve power system in response to receiving an input command.

10. The system of claim 6, wherein:
the primary power system comprises a plurality of primary power-side UPSs and a power bus configured to supply primary power received from a primary power-side switchgear to each of the primary power-side UPSs; and
the open-transition transfer switch is electrically coupled to the power bus, wherein the open-transition transfer switch is configured to supply reserve power to each of the primary power-side UPSs via the power bus.

11. The system of claim 6, wherein a capacity of the open-transition transfer switch to supply reserve power is exceeded by a total power requirement of the two or more sets of computer systems.

12. The system of claim 6, comprising:
a closed-transition transfer switch configured to selectively switch a power feed supporting at least one of the two or more sets of computer systems between a primary power source and a reserve power source.

13. The system of claim 12, further comprising:
a switch controller configured to selectively enable the closed-transition transfer switch to selectively switch between the primary power feed and the reserve power feed based at least in part upon a testing of synchronization of the primary power feed with the reserve power feed.

14. A method comprising:
- monitoring a primary power feed supplied to the plurality of computer systems via at least one portion of a primary power system that is separate from a reserve power system, wherein the reserve power system is configured to automatically supply reserve power to the plurality of computer systems via one or more automatic transfer switches; and
- in response to a determination of a fault in the primary power feed through at least one other portion of the primary power system, triggering an open-transition transfer switch to selectively switch from supplying the primary power feed to the plurality of computer systems via the at least one portion of the primary power system to supplying a reserve power feed from the reserve power system to the plurality of computer systems via the at least one portion of the primary power system.

15. The method of claim 14, wherein the determination of a fault in the primary power feed comprises a determination of:
- a fault of a primary utility source to support the primary power feed; and
- an inability of a primary backup power source to support the primary power feed beyond a threshold parameter.

16. The method of claim 15, wherein the threshold parameter includes a predetermined time interval.

17. The method of claim 15, wherein the threshold parameter includes a projected cost associated with the primary backup power source supporting the primary power feed.

18. The method of claim 15, wherein the threshold parameter includes a projected start-up time associated with the primary backup power source.

19. The method of claim 14, wherein:
- the at least one portion of the primary power system comprises a downstream portion of the primary power system that is downstream of an electrical coupling of the reserve power feed to the primary power system;
- the at least one other portion of the primary power system comprises an upstream portion of the primary power system that is upstream of the electrical coupling of the reserve power feed to the primary power system and includes the primary power feed; and
- triggering the open-transition transfer switch to selectively switch from supplying the primary power feed to the plurality of computer systems via the downstream portion to supplying the reserve power feed to the plurality of computer systems via the downstream portion enables the upstream portion to be bypassed from supplying power the plurality of computer systems.

20. The method of claim 14, wherein:
- triggering the open-transition transfer switch to selectively switch from supplying the primary power feed to the plurality of computer systems via the at least one portion to supplying the reserve power feed to the plurality of computer systems via the at least one portion comprises triggering the open-transition transfer switch to divert the reserve power feed from being supplied to a downstream portion of the reserve power system to be supplied to a downstream portion of the primary power system.

* * * * *